(12) United States Patent
Hong et al.

(10) Patent No.: US 11,184,881 B2
(45) Date of Patent: Nov. 23, 2021

(54) DEVICE AND METHOD FOR ALLOCATING AND INDICATING RESOURCES IN WIRELESS COMMUNICATION SYSTEM

(71) Applicant: Samsung Electronics Co., Ltd., Suwon-si (KR)

(72) Inventors: Sungnam Hong, Suwon-si (KR); Jongbu Lim, Seoul (KR); Yongok Kim, Seoul (KR); Chanhong Kim, Suwon-si (KR); Yeohun Yun, Hwaseong-si (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 16/622,853

(22) PCT Filed: Jun. 15, 2018

(86) PCT No.: PCT/KR2018/006737
§ 371 (c)(1),
(2) Date: Dec. 13, 2019

(87) PCT Pub. No.: WO2018/230981
PCT Pub. Date: Dec. 20, 2018

(65) Prior Publication Data
US 2020/0205130 A1 Jun. 25, 2020

(30) Foreign Application Priority Data

Jun. 15, 2017 (KR) .......................... 10-2017-0075883

(51) Int. Cl.
*H04W 72/04* (2009.01)

(52) U.S. Cl.
CPC .......... *H04W 72/04* (2013.01); *H04W 72/044* (2013.01); *H04W 72/0486* (2013.01); *H04W 72/0493* (2013.01)

(58) Field of Classification Search
CPC ............... H04W 72/04; H04W 72/044; H04W 72/0486; H04W 72/0493
See application file for complete search history.

(56) References Cited

U.S. PATENT DOCUMENTS

| | | | |
|---|---|---|---|
| 8,400,998 B2 * | 3/2013 | Kuchibhotla | H04W 72/0406 370/348 |
| 2008/0261610 A1 * | 10/2008 | Villier | H04W 16/06 455/452.1 |

(Continued)

OTHER PUBLICATIONS

ISA/KR, International Search Report and Written Opinion of the International Searching Authority, International Application No. PCT/KR2018/006737, dated Sep. 13, 2018, 13 pages.

(Continued)

*Primary Examiner* — Raj Jain

(57) ABSTRACT

Disclosed is a 5G ($5^{th}$ generation) or pre-5G communication system for supporting a data transmission rate higher than that of a 4G ($4^{th}$ generation) communication system such as a long term evolution (LTE). The present disclosure is for allocating and indicating resources in a wireless communication system, and an operation method of a base station comprises the steps of: allocating a first resource for a first service; allocating a second resource for a second service in consideration of the first resource; and transmitting resource allocation information on the second resource and data of the second service, wherein the second resource is discontinuously allocated, at a frequency axis, in a logical or physical manner, and the resource allocation information indicates the second resource by using at least one starting location and at least one length.

12 Claims, 27 Drawing Sheets

(56) References Cited

U.S. PATENT DOCUMENTS

| | | |
|---|---|---|
| 2015/0110056 A1 | 4/2015 | Wang et al. |
| 2015/0256308 A1* | 9/2015 | Ma et al. |
| 2017/0064718 A1* | 3/2017 | Bharadwaj ............ H04W 28/08 |
| 2018/0249448 A1* | 8/2018 | Yasukawa ............. H04L 5/0048 |
| 2020/0205130 A1* | 6/2020 | Hong ................... H04W 72/10 |

OTHER PUBLICATIONS

3GPP TS 36.213 V14.2.0 (Mar. 2017), Technical Specification, 3rd Generation Partnership Project; Technical Specification Group Radio Access Network; Evolved Universal Terrestrial Radio Access (E-UTRA); Physical layer procedures (Release 14), 441 pages.
Huawei, et al., "On uplink resource allocation," R1-1708120 3GPP TSG-RAN WG1 Meeting #89, Hangzhou, China, May 15-19, 2017, 3 pages.
Intel Corporation, "Indication of preemption of DL transmission," R1-1707414, 3GPP TSG RAN WG1 Meeting #89, Hangzhou, China, May 15-19, 2017, 6 pages.
Nokia, et al., "On resource allocation and TBS determination for PDSCH and CP-OFDM based PUSCH in NR," R1-1708521, 3GPP TSG RAN WG1 #89, Hangzhou, China, May 15-19, 2017, 4 pages.
Samsung, "Summary of e-mail discussions on multiplexing eMBB and URLLC in DL," R1-1700972, TSG-RAN WG1 NR Ad-hoc Meeting, Spokane, USA, Jan. 16-20, 2017, 23 pages.
Huawei et al., "Discussion on mini-slot for URLLC", 3GPP TSG RAN WG1 NR-Adhoc Meeting, Jan. 16-20, 2017, R1-1700023, 8 pages.
Notice of Preliminary Rejection dated May 18, 2021 in connection with Korean Patent Application No. 10-2017-0075883, 11 pages.

\* cited by examiner

| 1002 | 1004-1 | 1014-2 |
|---|---|---|
| RESOURCE TYPE INDICATOR | FIRST RIV | SECOND RIV |

FIG.10B

| RESOURCE TYPE INDICATOR (1102) | FIRST RIV (1114-1) | SECOND RIV (1114-2) | OFFSET (1106) |
|---|---|---|---|

FIG.11D

| TYPE INDICATOR ⌒1222 | RBG CONFIGURATION ⌒1224 | ALLOCATION INFORMATION ⌒1226 |
|---|---|---|

FIG.12C

| TYPE INDICATOR ₅1222 | RBG CONFIGURATION ₅1224 | RIV ₅1228 |

FIG.12D

| TYPE INDICATOR | RGB CONFIGURATION | RIV | OFFSET |
|---|---|---|---|

FIG.13C

DEVICE AND METHOD FOR ALLOCATING AND INDICATING RESOURCES IN WIRELESS COMMUNICATION SYSTEM

CROSS-REFERENCE TO RELATED APPLICATIONS

This application is a 371 National Stage of International Application No. PCT/KR2018/006737, filed Jun. 15, 2018, which claims priority to Korean Patent Application No. 10-2017-0075883, filed Jun. 15, 2017, the disclosures of which are herein incorporated by reference in their entirety.

BACKGROUND

1. Field

The disclosure generally relates to a wireless communication system, and more particularly, to a method and a device for allocating and indicating resources in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Based on the above-described various types of technology developments, supporting more various services in the 5G system is considered, when compared to the legacy 4G system. For example, representative services may be, for example, an enhanced mobile broadband (eMBB) service for a mobile ultra broadband service, an ultra-reliable and low latency communication (URLLC) service for ultra high reliability and low latency service, a massive machine type communication (mMTC) service for a massive machine type communication service, an evolved multimedia broadcast/multicast service (eMBMS) for a next generation broadcasting service, and the like. Among them, URLLC is a service that is newly considered in the 5G system, unlike the legacy 4G system. URLLC requires that ultra high reliability (e.g., a packet error rate of 10-5) and low latency (e.g., a latency of 0.5 msec) conditions are satisfied, when compared to other services. In order to satisfy the strict requirements, the URLLC service needs to apply a short transmission time interval (TTI) which is shorter than that of the eMBB service, and considers various types of operation schemes using the same.

SUMMARY

Therefore, the disclosure has been made in view of the above-mentioned problems, and an aspect of the disclosure is to provide a method and device for effectively supporting heterogeneous services in a wireless communication system.

Also, the disclosure is to provide a method and device for minimizing a performance deterioration caused by puncturing a signal in a wireless communication system.

Also, the disclosure is to provide a method and device for enabling two services to effectively coexist, if a service having a high priority needs to be provided in the situation in which a resource is already allocated to a service having a low priority among heterogeneous services supported in a wireless communication system.

Also, the disclosure is to provide a method and a device for allocating and indicating a resource to a service having a high priority among heterogeneous services supported in a wireless communication system.

Also, the disclosure is to provide a method and a device for minimizing puncturing of a resource allocated to a service having a low priority among heterogeneous services supported in a wireless communication system.

According to various embodiments of the disclosure, an operation method of a base station in a wireless communication system may include: allocating a first resource for a first service; allocating a second resource for a second service in consideration of the first resource; and transmitting resource allocation information associated with the second resource and data of the second service. Here, the second resource is logically or physically discontiguously allocated in a frequency axis, and the resource allocation information indicates the second resource using at least one start point and at least one length.

According to various embodiments of the disclosure, an operation method of a terminal in a wireless communication system may include: receiving resource allocation information associated with a second resource for a second service which is allocated in consideration of a first resource for a first service; and receiving data based on the resource allocation information. Here, the second resource is logically or physically discontiguously allocated in a frequency axis, and the resource allocation information indicates the second resource using at least one start point and at least one length.

According to various embodiments of the disclosure, a base station device in a wireless communication system may include: at least one processor configured to allocate a first resource for a first service, and to allocate a second resource for a second service in consideration of the first resource; and a transceiver configured to transmit resource allocation information associated with the second resource and data of the second service. Here, the second resource is logically or physically discontiguously allocated in a frequency axis, and the resource allocation information indicates the second resource using at least one start point and at least one length.

According to various embodiments of the disclosure, a terminal device in a wireless communication system may include: a transceiver configured to receive resource allocation information associated with a second resource for a second service allocated in consideration of a first resource for a first service, and to receive data based on the resource allocation information. Here, the second resource is logically or physically discontiguously allocated in a frequency axis, and the resource allocation information indicates the second resource using at least one start point and at least one length.

A method and a device according to various embodiments may allocate resources of a second service while minimally affecting to a first service, if the second service having a high priority needs to be transmitted in the situation in which the first service having a low priority is being transmitted in a wireless communication system, so that the performance deterioration of the first service may be dramatically improved.

Effects which can be acquired by the disclosure are not limited to the above described effects, and other effects that have not been mentioned may be clearly understood by those skilled in the art from the following description.

BRIEF DESCRIPTION OF THE DRAWINGS

FIG. 10B is a diagram illustrating an example of resource allocation information that indicates resources using values indicating a start point and a length in a wireless communication system according to various embodiments of the disclosure;

FIGS. 11C and 11D are diagrams illustrating examples of resource allocation information indicating resources allocated using an offset (with an offset) in a wireless communication system according to various embodiments of the disclosure;

FIGS. 12C and 12D are diagrams illustrating examples of resource allocation information indicating resources allocated symmetrically in a wireless communication system according to various embodiments of the disclosure;

FIG. 13C is a diagram illustrating an example of resource allocation information indicating resources which are allocated symmetrically using an offset (with an offset), in a wireless communication system according to various embodiments of the disclosure.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to a method and a device for supporting different services in a wireless communication system. Particularly, the disclosure describes a technology for overcoming drawbacks caused when different services coexist in the wireless communication system.

Hereinafter, terms indicating a signal, terms indicating control information (e.g., a resource indication value (RIV), an offset, an indicator, and the like), terms indicating network entities, terms indicating components of a device, and the like are used for ease of description. Accordingly, the disclosure is not limited to the following terms and other terms having the same technical meaning may be used.

Also, although the disclosure describes various embodiments using the terms used in some communication standards (e.g., $3^{rd}$ generation partnership project (3GPP)), the embodiments are merely examples. Various embodiments of the disclosure may be easily modified and applied to other communication systems.

Figure 1:
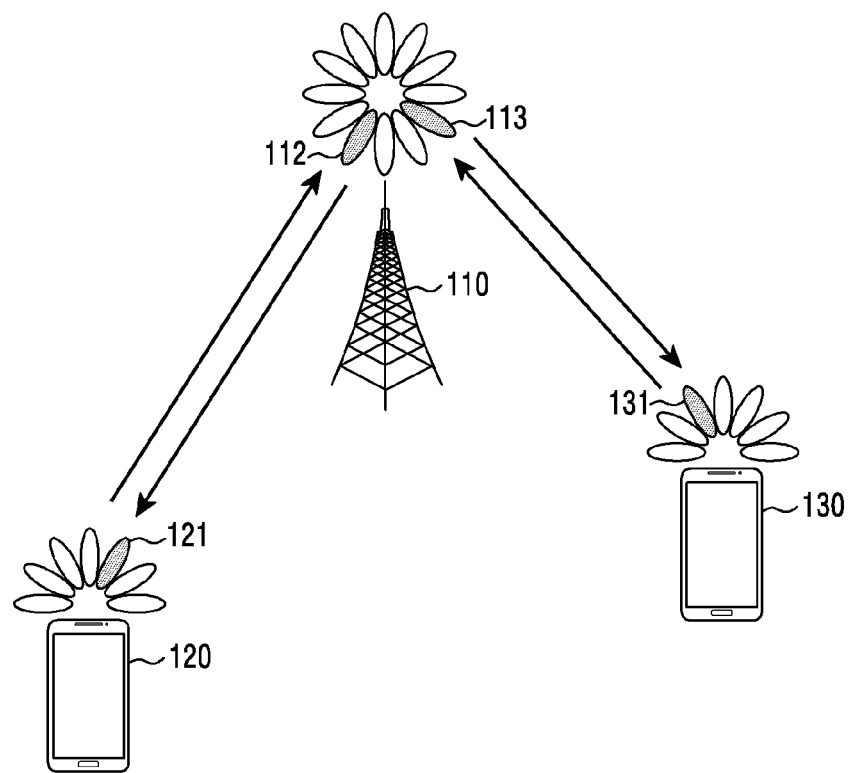
FIG. 1 is a diagram illustrating a wireless communication system according to various embodiments of the disclosure.

FIG. 1 is a diagram illustrating a wireless communication system according to various embodiments. FIG. 1 illustrates a base station 110, a terminal 120, and a terminal 130, as some of the nodes that use wireless channels in a wireless communication system. Although FIG. 1 illustrates a single base station, another base station which is the same as or similar to the base station 110 may be further included.

The base station 110 may be a network infrastructure that provides radio access to terminals 120 and 130. The base station 110 may have coverage defined by a predetermined geographical area based on a distance to which the base station 110 is capable of transmitting a signal. The base station 110 may be referred to as an access point (AP), an eNodeB (eNB), a $5^{th}$ generation node (5G node), a wireless point, a transmission/reception point (TRP), or other terms having the technical meaning equivalent thereto, in addition to a base station.

Each of the terminals 120 and 130 may be a device used by a user, and may communicate with the base station 110 via a wireless channel. Depending on the case, at least one of the terminals 120 and 130 may operate without operation by a user. That is, at least one of the terminals 120 and 130 is a device that performs machine type communication (MTC), and may not be carried by a user. Each of the terminals 120 and 130 may be referred to as a user equipment (UE), a mobile station, a subscriber station, a remote terminal, a wireless terminal, a user device, or other terms having technical meanings equivalent thereto, in addition a terminal.

According to an embodiment, the base station 110, the terminal 120, and the terminal 130 may transmit and receive wireless signals in a millimeter wave (mmWave) band (e.g., 28 GHz, 30 GHz, 38 GHz, and 60 GHz). In this instance, in order to improve a channel gain, the base station 110, the terminal 120, and the terminal 130 may perform beamforming. Here, the beamforming includes transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 via a beam search procedure. According to various embodiments, the base station 110, the terminal 120, and the terminal 130 may not perform beamforming.

Figure 2:
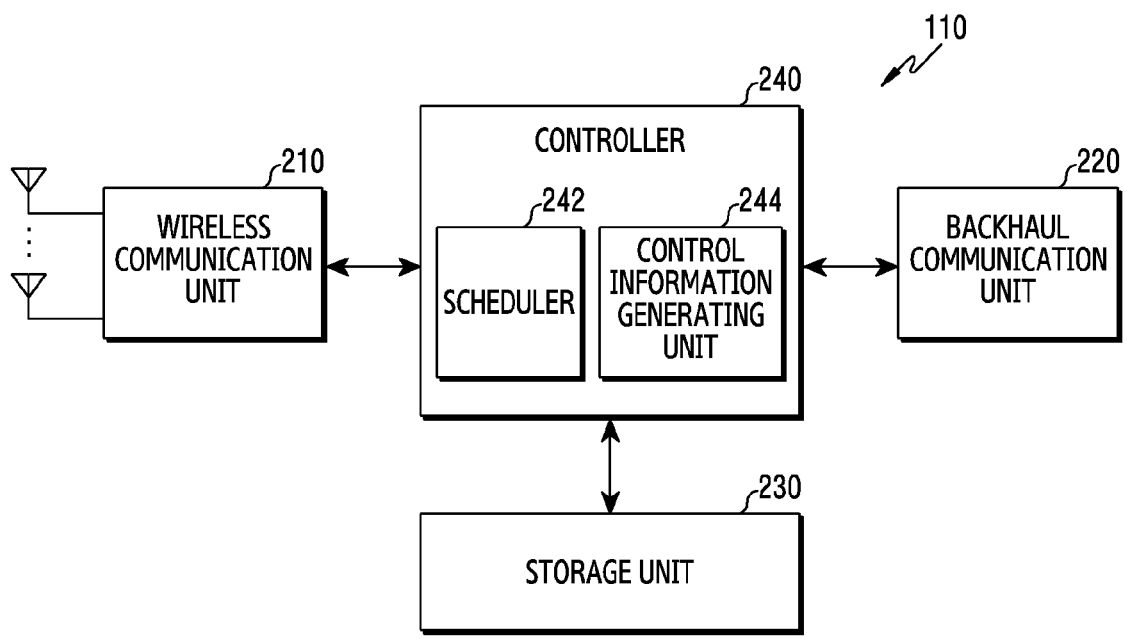
FIG. 2 is a block diagram illustrating a configuration of a base station in a wireless communication system according to various embodiments of the disclosure.

FIG. 2 is a block diagram illustrating a configuration of a base station in a wireless communication system according to various embodiments of the disclosure. The configuration of FIG. 2 may be understood as the configuration of the base station 110. The term "~unit" or "~er" used hereinafter may refer to a unit of processing at least one function or operation, and may be implemented as hardware, software, or a combination of hardware and software.

Referring to FIG. 2, the base station may include a wireless communication unit 210, a backhaul communication unit 220, a storage unit 230, and a controller 240.

The wireless communication unit 210 performs functions of transmitting or receiving a signal via a wireless channel. For example, the wireless communication unit 210 performs a function of conversion between a baseband signal and a bit stream according to the physical layer standard of the system. For example, in the case of data transmission, the wireless communication unit 210 generates complex symbols by encoding and modulating a transmission bit stream. Also, in the case of data reception, the communication unit 210 restores a reception bit stream by demodulating and decoding a baseband signal. Also, the wireless communication unit 210 up-converts a baseband signal into a radio-frequency (RF) band signal and transmits the same via an antenna, and down-converts an RF band signal received via an antenna into a baseband signal.

To this end, the wireless communication unit 210 may include a transmission filter, a reception filter, an amplifier, a mixer, an oscillator, a digital-to-analog convertor (DAC), an analog-to-digital convertor (ADC), and the like. Also, the wireless communication unit 210 may include a plurality of transmission/reception paths. In addition, the wireless communication unit 210 may include at least one antenna array including a plurality of antenna elements. From the perspective of hardware, the wireless communication unit 210 may be configured with a digital unit and an analog unit. The analog unit may include a plurality of sub-units depending on an operating power, an operating frequency, or the like.

The wireless communication unit 210 may transmit or receive a signal as described above. Accordingly, the entirety or a part of the wireless communication unit 210 may be referred to as a "transmitter", "receiver", or "transceiver". Also, the transmission and reception performed via a wireless channel, which is described in the following descriptions, may be understood as a meaning including that the above-described processing is performed by the wireless communication unit 210.

The backhaul communication unit 220 provides an interface for performing communication with other nodes within the network. That is, the backhaul communication unit 220 converts a bit stream transmitted from the base station to another node, for example, another access node, another base station, or a core network, into a physical signal, and converts a physical signal received from another node into a bit stream.

The storage unit 230 may store data, such as a basic program for operating the base station, an application program, configuration information, and the like. The storage unit 230 may be implemented as a volatile memory, a non-volatile memory, or a combination of a volatile memory and a non-volatile memory. In addition, the storage unit 230 may provide data stored therein in response to a request from the controller 240.

The controller 240 controls overall operation by the base station. For example, the controller 240 may transmit and receive a signal via the wireless communication unit 210 or the backhaul communication unit 220. Further, the controller 240 records data in the storage unit 230 and reads the recorded data. The controller 240 may perform functions of a protocol stack that the communication standard requires. To this end, the controller 240 may include at least one processor.

According to various embodiments, the controller 240 may include a scheduler 242 for allocating resources for supporting different services, and a control information generating unit 244 for generating control information for coexistence of services. According to various embodiments, the scheduler 242 may reallocate a resource, which has been allocated to a first service, in order to provide a second service, according to a preemption based multiplexing scheme. Accordingly, a signal of the first service may be punctured, and the control information generating unit 244 may generate control information indicating a resource allocated for the second service. Here, the scheduler 242 and the control information generating unit 244 may be a set of instructions or codes stored in the storage unit 230, may be an instruction/code at least temporarily residing in the controller 240 or a storage space that stores an instruction/code, or may be a part of a circuit (circuitry) included in the controller 240. Also, the controller 240 may perform control so that the base station performs operations according to various embodiments described below.

Figure 3:
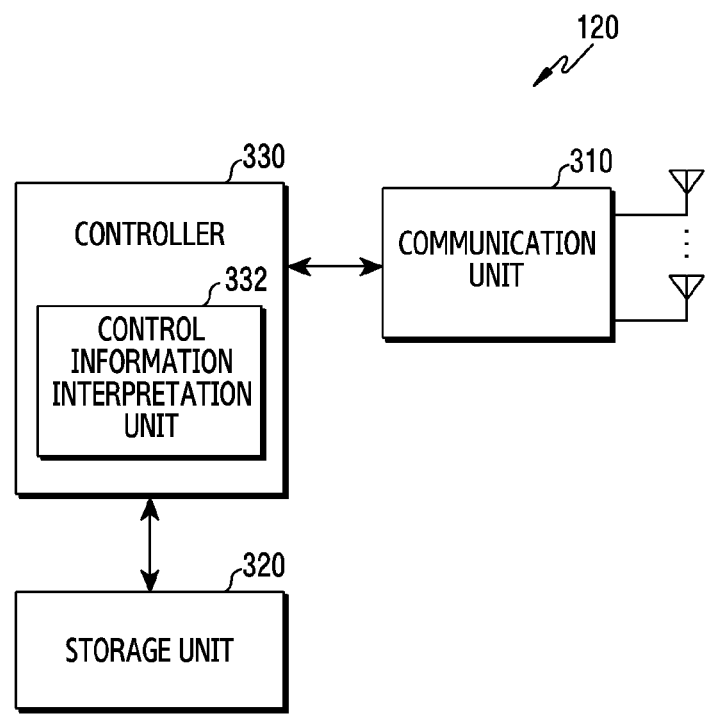
FIG. 3 is a block diagram illustrating a configuration of a terminal in a wireless communication system according to various embodiments of the disclosure.

FIG. 3 is a block diagram illustrating a configuration of a terminal in a wireless communication system according to various embodiments of the disclosure. The configuration of FIG. 3 may be understood as the configuration of the terminal 120. The term "~unit" or "~er" used hereinafter may refer to a unit of processing at least one function or operation and may be implemented as hardware, software, or a combination of hardware and software.

Referring to FIG. 3, the terminal includes a communication unit 310, a storage unit 320, and a controller 330.

The communication unit 310 performs functions of transmitting or receiving a signal via a wireless channel. For example, the communication unit 310 performs a function of conversion between a baseband signal and a bit stream according to the physical layer standard of the system. For example, in the case of data transmission, the communication unit 310 generates complex symbols by encoding and modulating a transmission bit stream. Also, in the case of data reception, the communication unit 310 restores a reception bit stream by demodulating and decoding a baseband signal. Also, the communication unit 310 up-converts a baseband signal into an RF band signal and transmits the same via an antenna, and down-converts an RF band signal received via an antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. In addition, the communication unit 310 may include at least one antenna array including a plurality of antenna elements. From the perspective of hardware, the communication unit 310 may include a digital circuit and an analog circuit (e.g., a radio frequency integrated circuit (RFIC)). Here, the digital circuit and the analog circuit may be implemented as a single package. Also, the communication unit 310 may include a plurality of RF chains. In addition, the communication unit 310 may perform beamforming.

The communication unit 310 may transmit or receive a signal as described above. Accordingly, the entirety or a part of the communication unit 310 may be referred to as a "transmitter", "receiver", or "transceiver". Also, the transmission and reception performed via a wireless channel, which is described in the following descriptions, may be understood as a meaning including that the above-described processing is performed by the communication unit 310.

The storage unit 320 may store data, such as a basic program for operating a terminal, an application program, configuration information, and the like. The storage unit 320 may be configured as a volatile memory, a non-volatile memory, or a combination of a volatile memory and a non-volatile memory. In addition, the storage unit 320 may provide data stored therein in response to a request from the controller 330.

The controller 330 may control overall operation of a terminal. For example, the controller 330 may transmit and receive signals via the communication unit 310. Further, the controller 330 records data in the storage unit 320 and reads the recorded data. The controller 330 may perform functions of a protocol stack that the communication standard requires. To this end, the controller 330 may include at least one processor or micro-processor, or may be a part of the processor. Also, a part of the communication unit 310 and the controller 330 may be referred to as a communication processor (CP).

According to various embodiments, the controller 330 may include a control information interpretation unit 332 that interprets control information received from a base station. According to various embodiments, the control information interpretation unit 332 may interpret control information so as to identify resources allocated for a second service according to the preemption based multiplexing scheme. Here, the control information interpretation unit 332 may be a set of instructions or codes stored in the storage unit 320, may be an instruction/code at least temporarily residing in the controller 330 or a storage space that stores an instruction/code, or may be a part of a circuit (circuitry) included in the controller 330. Also, the controller 330 may perform control so that the terminal performs operations according to various embodiments described below.

Figure 4:
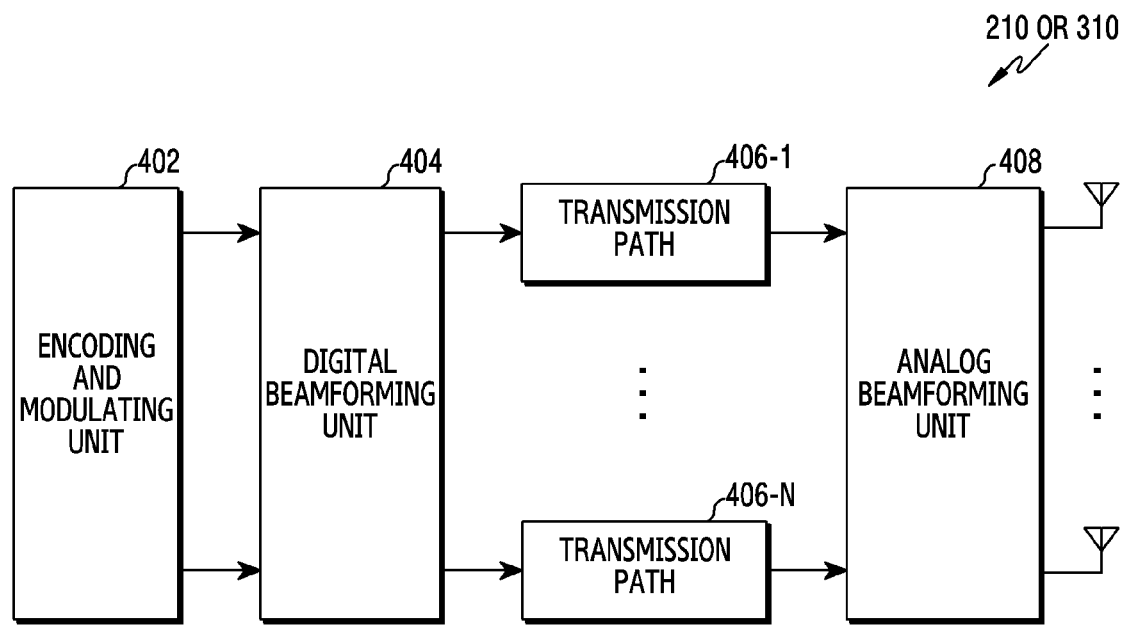
FIG. 4 is a block diagram illustrating a configuration of a communication unit in a wireless communication system according to various embodiments of the disclosure.

FIG. 4 is a block diagram illustrating a configuration of a communication unit in a wireless communication system according to various embodiments of the disclosure. FIG. 4 illustrates an example of the detailed configuration of the wireless communication unit 210 of FIG. 2 or the communication unit 310 of FIG. 3. Particularly, FIG. 4 illustrates components for performing beamforming, which correspond to a part of the wireless communication unit 210 of FIG. 2 or the communication unit 310 of FIG. 3.

Referring to FIG. 4, the wireless communication unit 210 or the communication unit 310 may include an encoding and modulating unit 402, a digital beamforming unit 404, a plurality of transmission paths 406-1 to 406-N, and an analog beamforming unit 408.

The encoding and modulating unit 402 may perform channel encoding. To perform channel encoding, at least one of a low density parity check (LDPC) code, a convolution code, and a polar code may be used. The encoding and modulating unit 402 may perform constellation mapping, so as to generate modulated symbols.

The digital beamforming unit 404 may perform beamforming with respect to digital signals (e.g., modulated symbols). To this end, the digital beamforming unit 404 may multiply beamforming weights to modulated symbols. Here, the beamforming weights may be used for changing the size and the phase of signals, and may be referred to as a "precoding matrix", "precoder", and the like. The digital beamforming unit 404 may output digital-beamformed modulated symbols to the plurality of transmission paths 406-1 to 406-N. In this instance, according to a multiple input multiple output (MIMO) transmission scheme, the modulated symbols may be multiplexed or the modulated symbols may be provided to the plurality of transmission paths 406-1 to 406-N.

The plurality of transmission paths 406-1 to 406-N may change the digital-beamformed digital signals into analog signals. To this end, each of the plurality of transmission paths 406-1 to 406-N may include an inverse fast Fourier transform (IFFT) operation unit, a cyclic prefix (CP) insertion unit, a DAC, and an up-converter. The CP insertion unit is used for an orthogonal frequency division multiplexing (OFDM) scheme, and may be excluded if another physical layer scheme (e.g., a filter bank multi-carrier (FBMC)) is applied. That is, the plurality of transmission paths 406-1 to 406-N may provide an independent signal processing process with respect to a plurality of streams generated by digital beamforming. Depending on an implementation scheme, some of the components of the plurality of transmission paths 406-1 to 406-N may be used in common.

The analog beamforming unit 408 may perform beamforming with respect to analog signals. To this end, the digital beamforming unit 404 may multiply beamforming weights and analog signals. Here, the beamforming weights may be used for changing the size and phase of signals.

If the wireless communication system as shown in FIG. 1 is a $5^{th}$ generation (5G) communication system, the base station 110 and the terminals 120 and 130 may perform communication according to the 5G technology standard. The 5G communication system has a significantly broad band, when compared to the legacy $3^{rd}$ generation (3G) and $4^{th}$ generation (4G) (e.g., long term evolution (LTE) or LTE-advanced (LTE-A)) communication systems. Also, in the case of the legacy 3G and 4G communication systems, the technical standards are defined in consideration of backward compatibility. However, in the case of the 5G communication system, the technical standard is defined in consideration of forward compatibility.

In the 5G communication system, use cases associated with briefly three services are defined. The three services defined by the 5G communication system are as follows. First, there is an enhanced mobile broadband (eMBB) service which is data communication based on an improved transmission speed. Second, there is an ultra-reliable low latency communication (URLLC) service based on ultra( 超 )-low latency and high( 高 ) reliability. Third, there is an enhanced machine type communication (eMTC) service which is communication based on the large-scale Internet of Things (IoT), and a data communication service that obtains and delivers required information irrespective of time and place, via wireless connection among ( 間 ) things without direct operation by a user.

The above-described three services may be supported by the single base station 110 at the same time. Accordingly, for example, the terminal 120 may receive the eMBB service, and the terminal 130 may receive the URLLC service. Hereinafter, for ease of description, a terminal that receives the eMBB service is referred to as an "eMBB terminal", and a terminal that receives the URLLC service is referred to as an "URLLC terminal".

Hereinafter, for ease of description, the eMBB service is referred to as one of "data communication", "data communication service", or terms having a technical meaning which is equivalent thereto, and if the terms are used together, it should be understood that the terms indicate the same meaning. Also, the URLLC service is referred to as one of "ultra-low latency service", "high reliability service", "ultra-low latency communication", "high reliability communication" or terms having a technical meaning equivalent thereto, and if the terms are used together, it should be understood that the terms indicate the same meaning. Also, the eMTC service is referred to as one of "Internet of Things (IoT)", "IoT service", or terms having a technical meaning which is equivalent thereto, and if the terms are used together, it should be understood that the terms indicate the same meaning.

In order to satisfy the high reliability and low latency that the URLLC service requires, various operation schemes are being discussed, such as applying, to the URLLC service, a short transmission time interval (TTI), which is shorter than that of the eMBB service. For example, in a downlink network environment, a scenario is considered, in which the eMBB service operates by performing scheduling based on an eMBB slot, and the URLLC service operates by performing scheduling based on a URLLC slot which is shorter than an eMBB slot. According to the scenario, a base station may be placed in the situation of transmitting a URLLC packet in the middle of transmitting eMBB data which has already been scheduled. If the base station needs to transmit a URLLC packet while transmitting eMBB data, the base station 110 may need to reallocate a part of the resource which has been allocated to the eMBB service, in order to provide a URLLC service, according to the characteristic of the URLLC service that requires low latency.

Before describing resource allocation and signaling according to various embodiments, resource allocation for the eMBB service and the URLLC service will be described with reference to FIGS. 5A and 5B. Hereinafter, for ease of description, the eMBB service and the URLLC service are referred to as a first service and a second service. The first service and the second service described below may be understood as services other than the eMBB service and the URLLC service.

Figure 5A:
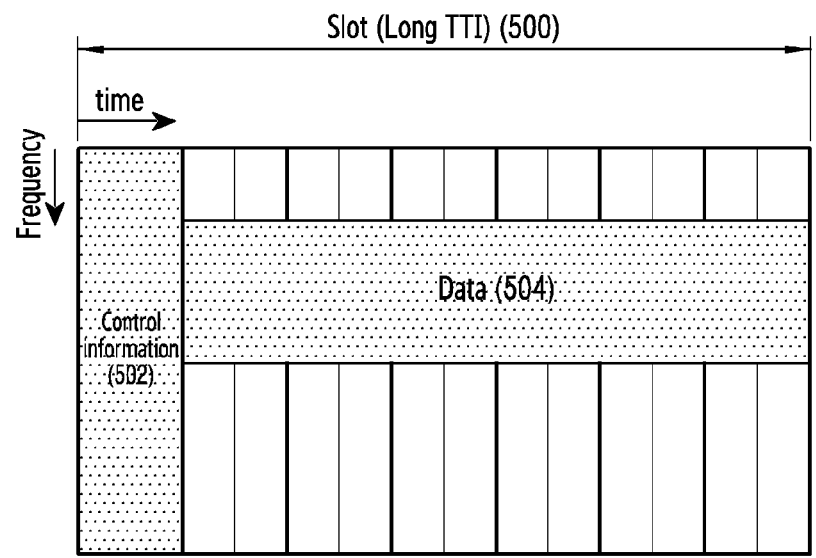
FIG. 5A is a diagram illustrating an example of allocating resources to a first service in a wireless communication system according to various embodiments of the disclosure.

FIG. 5A is a diagram illustrating an example of allocating resources to the first service in a wireless communication system according to various embodiments of the disclosure. In FIG. 5A, the horizontal axis indicates time resources, and the vertical axis indicates frequency resources. Referring to FIG. 5A, resource allocation in the wireless communication system may be performed based on a frequency resource unit and a time resource unit. In this instance, a time resource allocation unit for each service may be the same as or different from each other. FIG. 5A illustrates the case in which a time resource is allocated to the first service. In the first service, a unit of allocating a time resource is a long TTI 500. Here, a TTI is referred to as a "slot". The long TTI 500 allocated to the first service includes an area 502 in which a control channel (e.g., an eMBB control channel) for transmitting control information is transmitted, and an area 504 in which data of the first service is transmitted. In this instance, as illustrated in FIG. 5A, the area 504 may occupy a part of the entire bandwidth.

Figure 5B:
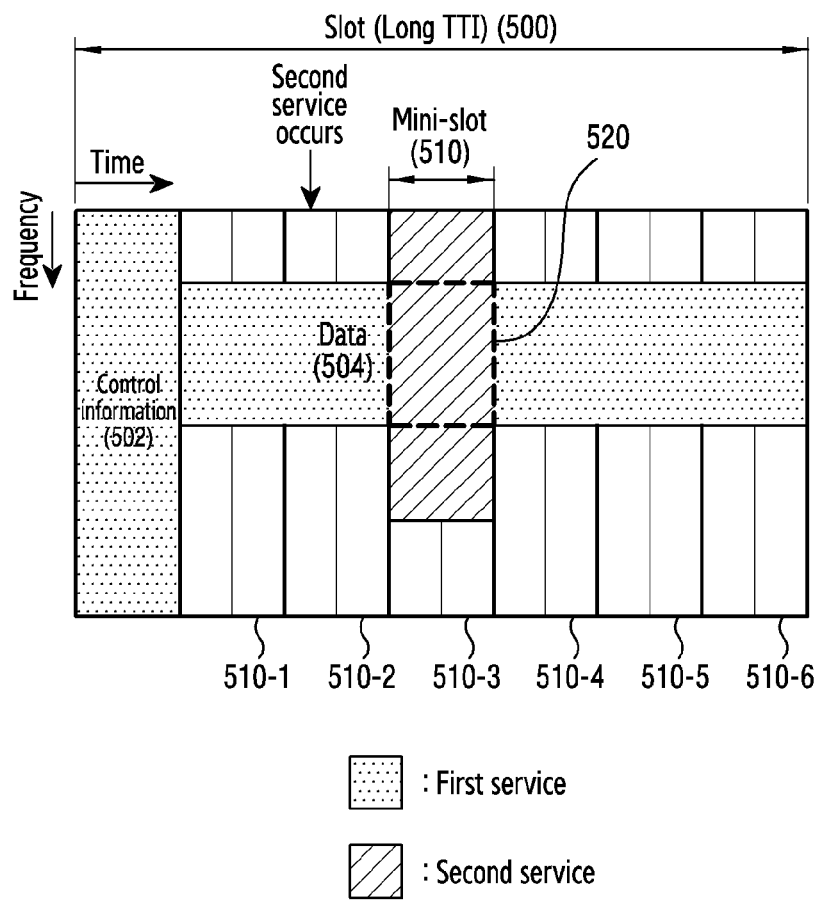
FIG. 5B is a diagram illustrating an example of allocating resources for a second service in a resource allocation area of a first service according to a preemption based multiplexing scheme in a wireless communication system according to various embodiments of the disclosure.

FIG. 5B is a diagram illustrating an example of allocating resources for the second service in a resource allocation area of the first service according to a preemption based multiplexing scheme in a wireless communication system according to various embodiments of the disclosure. Similar to FIG. 5A, in FIG. 5B, a frequency resource unit includes a predetermined frequency band or a predetermined number of frequency resources. The resources for the first service may be allocated in units of long TTIs 500, as described above. Conversely, referring to FIG. 5B, the resources for the second service may be allocated in units of short TTIs 510, instead of units of long TTIs 500. The short TTI 510 may be referred to as a "mini slot". The area 504, which is included in the long TTI 500 and in which data is transmitted, may include two or more short TTIs 510. FIG. 5B illustrates the case in which six short TTIs 510-1 to 510-6 are included. According to another embodiment, the data transmission area 504 of the long TTI 500 may include six or fewer short slots, or may include seven or more short slots.

As described above, if the first service is provided to a predetermined terminal, a base station may allocate resources in units of long TTIs 500. As illustrated in FIG. 5A, in one long TTI 500, the area 502 for a first service control channel that transmits control information and the area 504 for first service data may be included. A base station transmits control information required for reception of first service data, using the area 502. Accordingly, a terminal that is to receive the first service data may receive the control information in the area 502 first, and may demodulate and decode the first service data based on the control information.

Second service data may include data that requires ultra-low latency and high reliability. Therefore, if second service data burst occurs, the base station needs to relatively rapidly transmit the second service data. Therefore, as illustrated in FIG. 5B, resources may be allocated in units of short TTIs 510, and data may be transmitted with a short latency. Since the second service data is transmitted based on a short slot unit, the usable resources, for example, the resources capable of transmitting the second service data, may include resources that are already allocated to other terminals. In this instance, in consideration of the characteristics of the first service and the second service, the second service has a higher priority. Therefore, the base station may transmit second service data using some of the resources (e.g., the area 504 of the long TTI 500) which have been allocated to the first service.

FIG. 5B illustrates the case of allocating some of the resources allocated for the first service to a predetermined terminal, in order to transmit second service data. In other words, FIG. 5B illustrates the situation in which a base station desires to transmit second service data in a part of the area 504 for the first service data, but the area 504 is already allocated for first service data to be transmitted to a predetermined terminal. In this instance, the base station removes data allocated to a part of the area 504 for the first service data, and may transmit the second service data in the part of the area 520 where the allocated data is removed. That is, the first service and the second service may be provided according to the preemption based multiplexing scheme. Here, removing may be expressed as "puncturing". If the base station punctures data allocated in a part of the area 504 for the first service data, inserts second service data into the location where the data is removed, and performs transmission, a terminal that receives the first service may receive data different from data corresponding to the terminal. Hereinafter, for ease of description, "the terminal that receives the first service" may be referred to as a "first service terminal".

As described above, if second service data is transmitted in the long TTI 500 allocated to the first service terminal, the first service terminal may demodulate and decode a signal including the second service data. In this instance, demodulating and decoding the data may fail, which may cause deterioration of reception performance of the first service. If a transmission end (e.g., a base station) informs a reception end (e.g., a terminal) of a location where a first service signal is punctured in order to support the second service, the reception end may exclude a second service signal when performing decoding, so that the deterioration of the reception performance of the first service may be reduced. However, an effective channel encoding rate still increases since a part (e.g., the area 520) of the first service signal is removed. Accordingly, the deterioration of the reception performance of the first service may occur. Accordingly, the reception end may request retransmission from the transmission end, and a large number of retransmissions may be required due to the second service data. This may cause a waste of a band, and may cause the reception end to unnecessarily consume power.

Therefore, hereinafter, the disclosure provides a resource allocation rule that may minimize use of resources, which have been allocated for the first service, when a base station allocates resources for the second service, as a scheme of overcoming the deterioration of the reception performance of the first service and a waste of power at a reception end. In addition, the disclosure describes embodiments of generating resource allocation information that informs a terminal of allocated resources and embodiments of interpreting the resource allocation information, according to a rule described below. Hereinafter, for ease of description, the disclosure assumes the situation in which resources for a first service terminal are allocated in a part of the entire available band, and describes embodiments of effectively allocating resources for the second service. Various embodiments described below and some modifications may be applied even when resources are allocated for a plurality of first service terminals.

Figure 6:
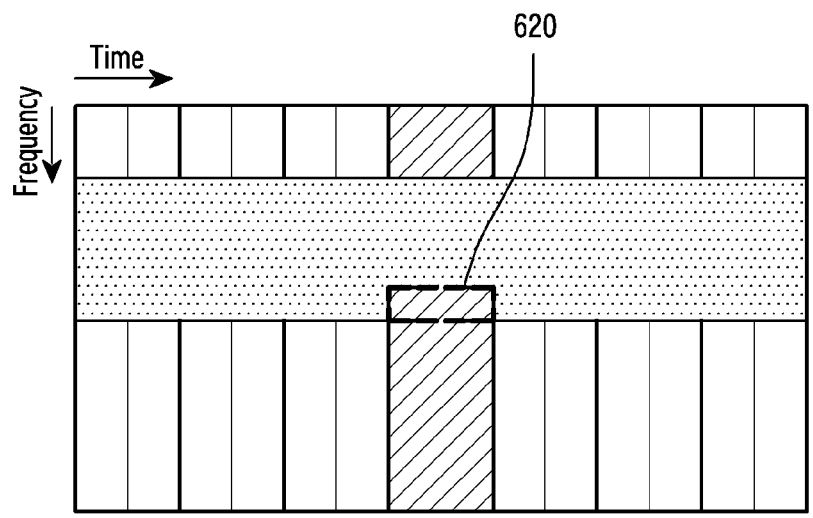
FIG. 6 is a diagram illustrating an example of allocating resources for a second service based on the priority of a resource area in a wireless communication system according to various embodiments of the disclosure.

FIG. 6 is a diagram illustrating an example of allocating resources for the second service based on the priority of a resource area in a wireless communication system according to various embodiments of the disclosure.

Referring to FIG. 6, in the process of allocating resources for the second service in the situation in which resources for the first service have been allocated, the resources for the second service are allocated preferentially in an area that is not occupied by the first service. If resources are further needed, the resources (e.g., resources 620) allocated for the first service may be additionally allocated for the second service. That is, in the resource allocation according to various embodiments, resources may have different priorities depending on whether corresponding resources are allocated for the first service.

After allocating resources to terminals, a base station may provide information related to resource allocation for the second service to the terminals. The information related to the resource allocation for the second service may be used when a first service terminal excludes a second service signal from signals to be decoded, and may used when a second service terminal receives a second service signal. That is, the first service terminal decodes the resource allocation information for the second service, so as to identify a signal that is transmitted to itself from among signals received in the entire frequency band. Therefore, a resource allocation information indication scheme capable of supporting the above-described resource allocation scheme is required.

As described above with reference to FIG. 6, in the process of allocating the resources for the second service, resources may have different priorities depending on whether a corresponding resource has been allocated for the first service. Accordingly, the amount of first service signals that are punctured may be minimized. According to the resource allocation rule which has been described with reference to FIG. 6, resources allocated for the second service may be logically or physically discontiguous in the frequency axis. For example, if the resources in the frequency axis are divided based on resource blocks (RBs), the indices of the RBs allocated for the second service may be discontiguous. Therefore, disclosed is an effective structure of resource allocation information that indicates resources which are logically or physically discontiguously allocated in the frequency axis.

Figure 7:
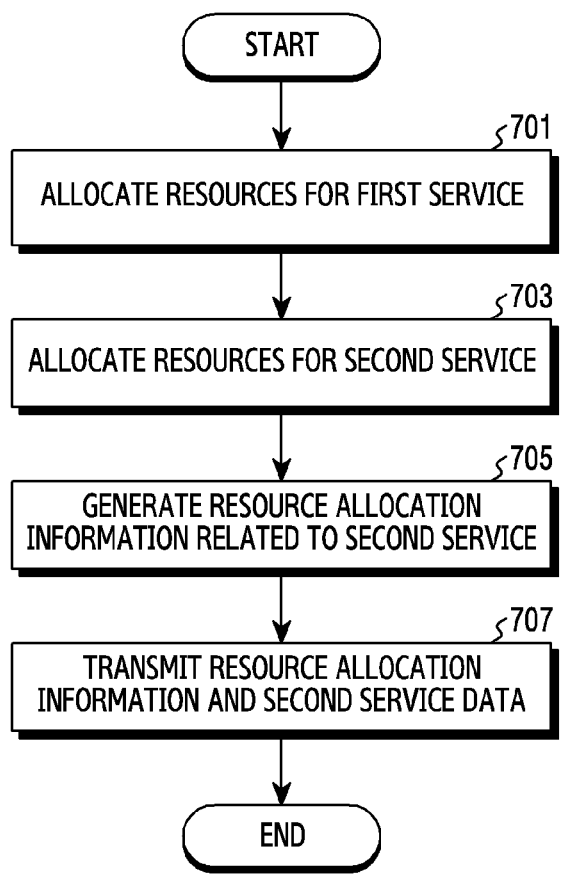
FIG. 7 is a flowchart illustrating operation by a base station in a wireless communication system according to various embodiments of the disclosure.

FIG. 7 is a flowchart illustrating operation by a base station in a wireless communication system according to various embodiments of the disclosure. FIG. 7 illustrates the operation method of the base station 110.

Referring to FIG. 7, in operation 701, the base station allocates resources for the first service. The resources for the first service may be allocated based on a TTI or a slot corresponding to the first service. In this instance, resources allocated for a single first service terminal may occupy a part of the entire available bandwidth in the frequency axis.

In operation 703, the base station allocates resources for the second service. The resources for the second service may be allocated based on a TTI or a slot corresponding to the second service. Here, the TTI or slot corresponding to the second service may be shorter than the TTI or slot corresponding to the first service. The resources for the second service may be allocated according to the preemption based multiplexing scheme. In this instance, according to an embodiment, the base station may preferentially allocate resources which are not allocated for the first service. In other words, the base station allocates resources for the second service in consideration of the location of the resources allocated for the first service. If the resources, which are not allocated for the first service, are insufficient for the second service, the base station may puncture and reallocate the resources which have been allocated for the first service. Accordingly, the resources for the second service may be logically or physically discontiguously allocated in the frequency axis.

In operation 705, the base station generates resource allocation information related to the second service. The resource allocation information indicates resources which are logically or physically discontiguous in the frequency axis. According to an embodiment, resource allocation information may indicate resources which are discontiguous in the frequency axis, using a single start point and a single length according to a circular shift concept or scheme. According to another embodiment, the resource allocation information may indicate resources allocated by excluding some resources corresponding to a high or low index using an offset. According to another embodiment, the resource allocation information may indicate, as representative information, information associated with one of a plurality of resource sets which may be specified based on the same pattern such as a symmetry pattern, a repetition pattern, or the like. According to another embodiment, the resource allocation information may indicate resources that are not allocated, and may indirectly indicate allocated resources. The structure of the resource allocation information provided in the disclosure is not limited to the above-described embodiments, and the resource allocation information may indicate resources allocated for the second service via various schemes.

In operation 707, the base station transmits resource allocation information related to the second service and second service data. The resource allocation information related to the second service may be transmitted via a control area (e.g., the area 502) for the first service, or may be transmitted via the resources allocated for the second service. The second service data may be transmitted via the resources allocated in operation 703.

Figure 8:
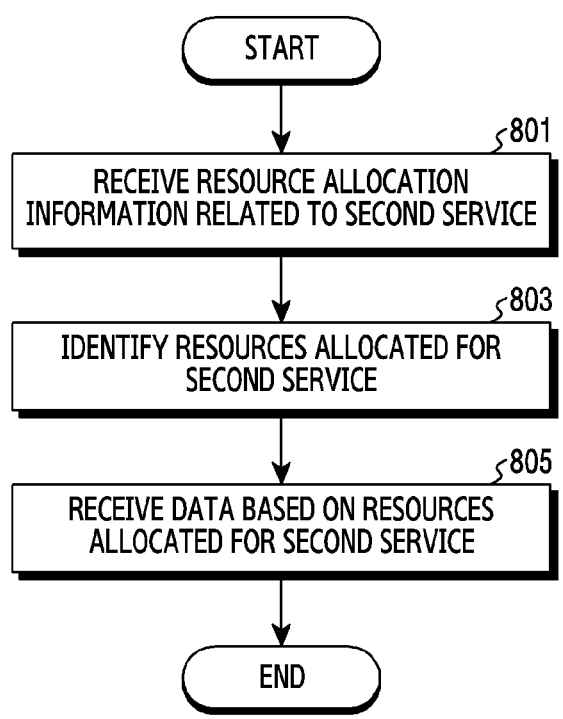
FIG. 8 is a flowchart illustrating operation by a terminal in a wireless communication system according to various embodiments of the disclosure.

FIG. 8 is a flowchart illustrating operation by a terminal in a wireless communication system according to various embodiments of the disclosure. FIG. 8 illustrates the operation method of the terminal 120 or the terminal 130.

Referring to FIG. 8, in operation 801, the terminal receives resource allocation information related to the second service. The resource allocation information indicates resources which are discontiguous in the frequency axis. According to an embodiment, the resource allocation information may indicate resources which are discontiguous in the frequency axis, using a single start point and a single length according to a circular shift concept or scheme. According to another embodiment, the resource allocation information may indicate resources allocated by excluding some resources corresponding to a high or low index using an offset. According to another embodiment, the resource allocation information may indicate, as representative information, information associated with one of a plurality of resource sets which may be specified based on the same pattern such as a symmetry pattern, a repetition pattern, or the like. According to another embodiment, the resource allocation information may indicate resources that are not allocated, and may indirectly indicate allocated resources. The structure of the resource allocation information provided in the disclosure is not limited to the above-described embodiments, and the resource allocation information may indicate resources allocated for the second service via various schemes.

In operation 803, the terminal identifies resources allocated for the second service. That is, the terminal may interpret the resource allocation information received in operation 801, and may identify information (e.g., RB indices or RB group (RBG) indices) associated with the resources allocated for the second service. To this end, the terminal may perform an operation associated with at least one value included in the resource allocation information according to a previously defined interpretation rule.

In operation 805, the terminal receives data based on the resources allocated for the second service. If the terminal uses the first service, the terminal may identify a second service signal which is to be excluded from signals to be decoded, using the resources allocated for the second service. If the terminal uses the second service, the terminal may identify resources from which a second service signal is to be extracted.

According to embodiments which have been described with reference to FIGS. 7 and 8, a base station may indicate resources allocated for the second service to a terminal. That is, although the resources allocated for the second service are discontiguous, the resources allocated for the second service may be effectively indicated with only a small overhead. Hereinafter, detailed embodiments associated with resource allocation information and generation and interpretation of the resource allocation information are provided.

Figure 9A:
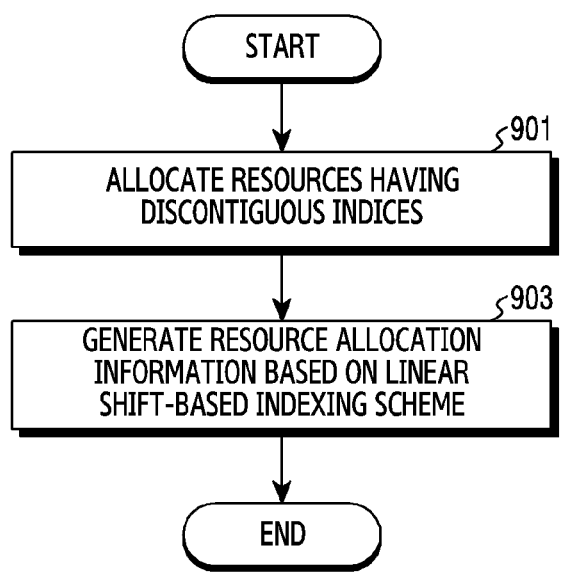
FIG. 9A is a flowchart illustrating an operation of indicating, by a base station, resources using a value indicating a start point and a length in a wireless communication system according to various embodiments of the disclosure.

FIG. 9A is a flowchart illustrating an operation of indicating, by a base station, resources using a value indicating a start point and a length in a wireless communication system according to various embodiments of the disclosure. FIG. 9A illustrates the operation method of the base station 110.

Referring to FIG. 9A, in operation 901, the base station allocates resources having discontiguous indices. For example, the base station may preferentially allocate resources having high priorities, according to the priorities of the resources. In this instance, if the resources having high priorities are distributed discontiguously, resources (e.g., RBs) having discontiguous indices may be allocated. In other words, when the base station sequentially allocates RBs from the given start point of the RBs, if the index of an allocated RB exceeds the index of the last RB in the entire frequency band, the remaining RBs that need to be allocated may be allocated from the first RB of the entire frequency band.

In operation 903, the base station may generate resource allocation information based on a circular shift-based indexing scheme. The circular shift-based indexing scheme may indicate a scheme in which a predetermined unit resource (e.g., an RB) indicated by an index exceeding the maximum value is circulated to be a unit resource indicated by an index having the minimum value. For example, the index of {maximum value+1} may indicate a unit resource indicated by the index of the minimum value. That is, the resource allocation information according to the embodiment is not restricted by the condition that the sum of the index of the start point of resources and the number of unit resources be less than or equal to the maximum value of an index. Accordingly, although the allocated resources have discontiguous indices, the resources may be indicated by at least one start point and at least one length.

To clearly describe the embodiment that indicates resources according to the procedure of FIG. 9A, a detailed example will be described with reference to FIGS. 9B to 9E.

Figure 9B:
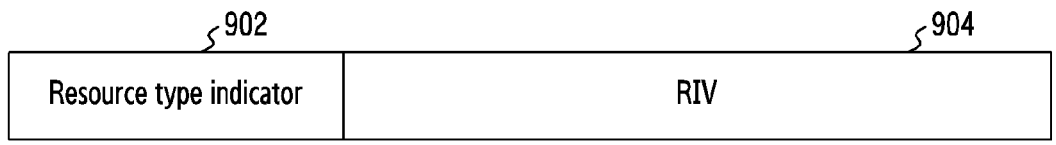
FIG. 9B is a diagram illustrating an example of resource allocation information that indicates resources using a value indicating a start point and a length in a wireless communication system according to various embodiments of the disclosure.

FIG. 9B is a diagram illustrating an example of resource allocation information that indicates resources using a value indicating a start point and a length in a wireless communication system according to various embodiments of the disclosure. Referring to FIG. 9B, the resource allocation information includes a resource type indicator 902 and an RIV 904. The resource type indicator 902 may indicate whether an allocated RB is a localized virtual RB (VRB) or a distributed VRB. The RIV 904 indicates the start point and the length of allocated resources. According to an embodiment of FIG. 9B, the start point and the length is expressed as a single value. That is, the RIV 904 is set to a value indicating one of a plurality of combinations derived from allocable RBs. According to another embodiment, the resource type indicator 902 may be omitted.

Figure 9C:
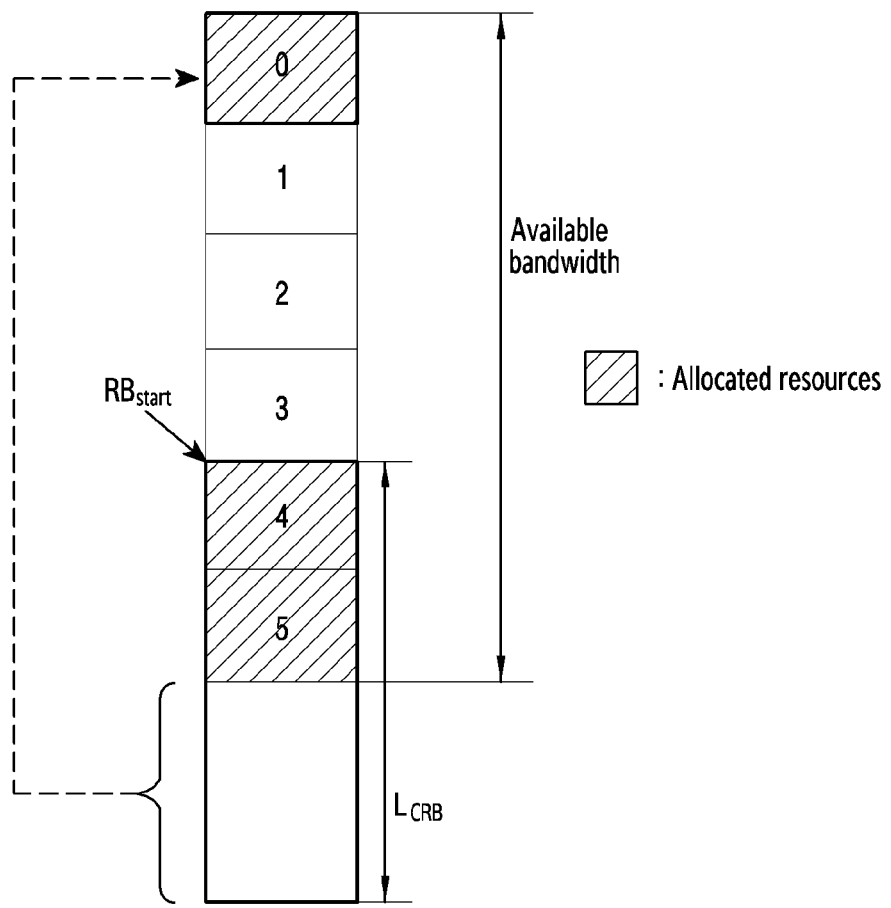
FIG. 9C is a diagram illustrating an example of a resource allocation result in a wireless communication system according to various embodiments of the disclosure.

FIG. 9C is a diagram illustrating an example of a resource allocation result in a wireless communication system according to various embodiments of the disclosure. FIG. 9C illustrates the case in which three RBs from among a total of six RBs are allocated. Referring to FIG. 9B, RB #0, RB #4, and RB #5 are allocated among six RBs included in the entire available bandwidth. That is, the indices of RBs are 0, 4, and 5, which are discontiguous. In this instance, the three RBs, RB #0, RB #4, and RB #5, may be indicated by the single RIV 904. Examples of mapping the RIV 904 and RBs are illustrated in FIGS. 9D and 9E.

Figure 9D:
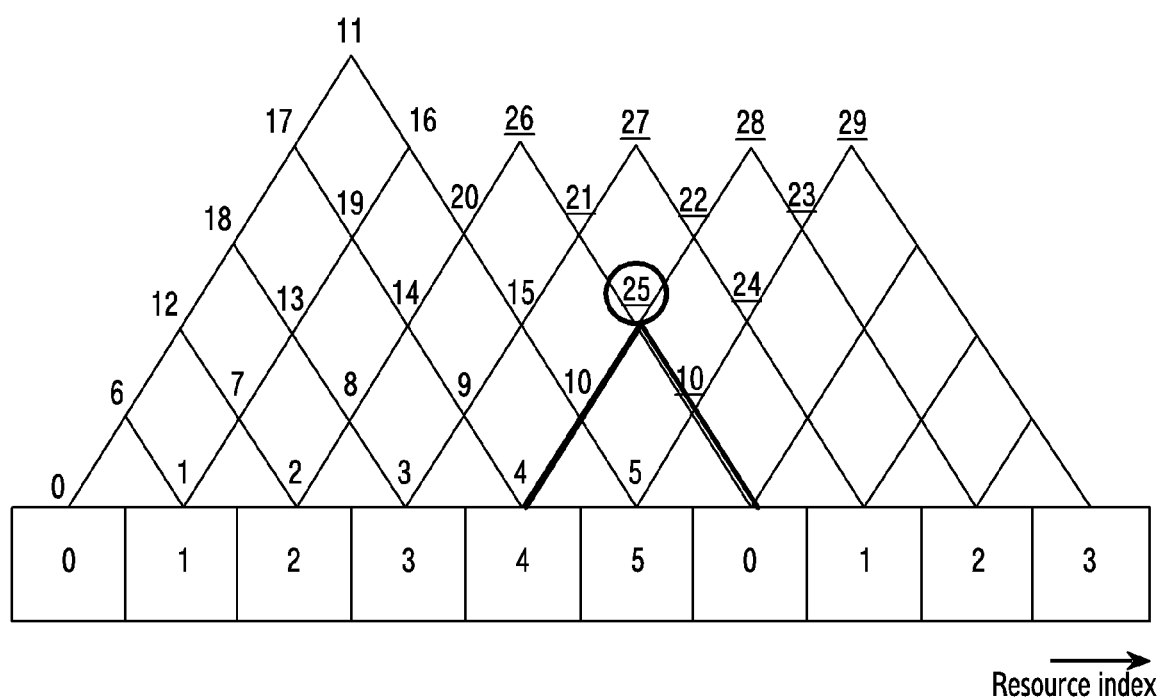
FIGS. 9D to 9E are diagrams illustrating examples of mapping between resources and values indicating the resources in a wireless communication system according to various embodiments of the disclosure.
Figure 9E:
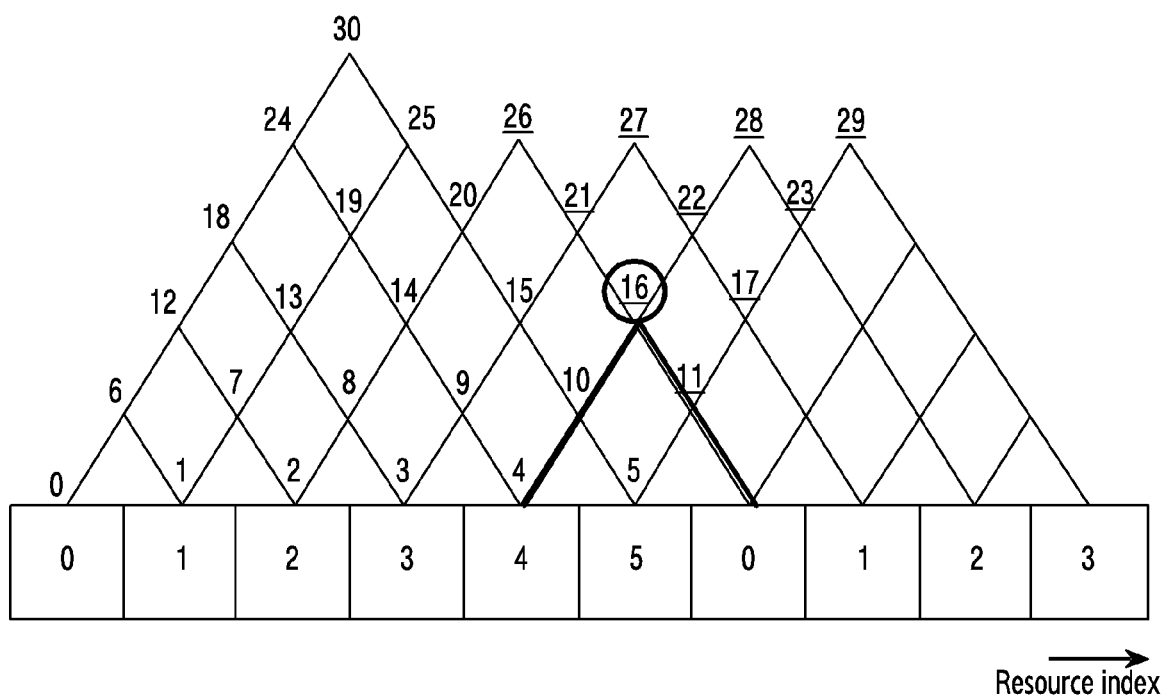

FIGS. 9D and 9E are diagrams illustrating an example of mapping between resources and values indicating the resources in a wireless communication system according to various embodiments of the disclosure. FIGS. 9D and 9E illustrate examples of a mapping relationship between RBs and the values of RIV 904. In FIGS. 9D and 9E, the underlined values of the RIV 904 indicate values defined to indicate discontiguous RBs.

Referring to FIG. 9D, the value of the RIV 904 in the range of 1 to 20 is used for indicating the contiguous RBs, and the value of the RIV 904 in the range of 21 to 29 is used for indicating discontiguously distributed RBs. In other words, a combination of RBs indicated by a value in the range of 21 to 29, which may be set as the value of RIV 904, may include RBs, the number of which is smaller than the total number of allocable RBs, and may include an RB (e.g., RB #0) having the minimum index and an RB (e.g., RB #5) having the maximum index among the allocable RBs. That is, according to an embodiment of FIG. 9D, whether RBs are discontiguous may be determined depending on the range of the value of the RIV 904. For example, according to the mapping relationship of FIG. 9D, the value of the RIV 904 may be set according to Equation 1.

if $(L_{CRB} \leq N_{RB}^{DL} - RB_{start})$ then if $(L_{CRB}-1) \leq \lfloor N_{RB}^{DL}/2 \rfloor$ then $RIV = N_{RB}^{DL}(L_{CRB}-1) + RB_{start}$ else $RIV = N_{RB}^{DL}(N_{RB}^{DL} - L_{CRB}+1) + (N_{RB}^{DL} - 1 - RB_{start})$ else if $(L_{CRB}-1) > \lfloor N_{RB}^{DL}/2 \rfloor$ then $RIV = N_{RB}^{DL}(L_{CRB}-1) + RB_{start}$ else $RIV = N_{RB}^{DL}(N_{RB}^{DL} - L_{CRB}+1) + (N_{RB}^{DL} - 1 - RB_{start})$      Equation 1 where $L_{CRB} \geq 1$.

In Equation 1, $L_{CRB}$ denotes the length of allocated resources, and indicates the number of RBs or RB groups. $N_{RB}^{DL}$ denotes the total number of RBs or RB groups existing in the entire frequency band. $RB_{start}$ denotes the start point of allocated resources (e.g., RBs or RB groups). An RIV indicates a parameter indicating allocated RBs.

According to Equation 1, if the sum of the start point of RBs and the number of allocated RBs does not exceed the maximum index, the value of the RIV 904 may be selected within the range of values that are mapped to contiguous RBs. Conversely, if the sum of the start point of RBs and the number of allocated RBs exceeds the maximum index, the value of the RIV 904 may be selected from the range of values that are mapped to discontiguous RBs. As illustrated in FIG. 9C, if RB #0, RB #4, and RB #5 are allocated, the value of the RIV 904 is determined to be 25 according to Equation 1.

A base station that uses mapping of FIG. 9D may determine the value of the RIV 904 based on Equation 1, and may generate and transmit resource allocation information including the determined value of the RIV 904. According to an embodiment, the base station may perform an operation of Equation 1 in order to determine the value of the RIV 904, every time that the base station performs resource allocation. Alternatively, according to another embodiment, the base station stores information (e.g., a mapping table) indicating a mapping relationship previously determined by Equation 1, and may search for the value of the RIV 904 corresponding to allocated RBs from the stored information.

For example, according to the mapping relationship of FIG. 9D, based on the value of the RIV 904 included in the resource allocation information, allocated resources may be identified as shown in Equation 2.

Step-1: $x = \mod(RIV, N_{RB}^{DL})$, $y = \lfloor RIV \mid N_{RB}^{DL} \rfloor$  Equation 2

Step-2: if $RIV \leq \dfrac{N_{RB}^{DL}(N_{RB}^{DL} + 1)}{2}$ then if $y + 1 \leq N_{RB}^{DL} - x$ then $L_{CRB} = y + 1, RB_{start} = x$ else $L_{CRB} = N_{RB}^{DL} - y + 1, RB_{start} = N_{RB}^{DL} - 1 - x$ else if $y + 1 > N_{RB}^{DL} - x$ then $L_{CRB} = y + 1, RB_{start} = x$ else $L_{CRB} = N_{RB}^{DL} - y + 1, RB_{start} = N_{RB}^{DL} - 1 - x$ Step-3: if $L_{CRB} \leq N_{RB}^{DL} - RB_{start}$ then Allocated $RB$ index = $RB_{start}$, $RB_{start} + 1, \ldots, L_{CRB} + RB_{start} - 1$ else Allocated $RB$ index = $RB_{start}, RB_{start} + 1$, $\ldots, N_{RB}^{DL} - 1, 0, \ldots, L_{CRB} + RB_{start} - N_{RB}^{DL} - 1$ In Equation 2, the RIV is a parameter indicating allocated RBs. $N_{RB}^{DL}$ denotes the total number of RBs or RB groups existing in the entire frequency band. $L_{CRB}$ denotes the length of allocated resources, which may be the number of RBs or RB groups. $RB_{start}$ denotes the start point of allocated resources.

A terminal that receives an RIV according to the mapping of FIG. 9D may interpret the value of the RIV 904 according to Equation 2, and may identify allocated RBs. According to an embodiment, the terminal may perform an operation of Equation 2 in order to determine allocated RBs every time that the terminal receives resource allocation information. Alternatively, according to another embodiment, the terminal stores information (e.g., a mapping table) indicating a mapping relationship previously determined by Equation 2, and may search for allocated RBs corresponding to the value of the received RIV 904, from the stored information.

According to FIG. 9E, the values of the RIV 904 may be arranged according to the number of allocated RBs, irrespective of whether the RBs are discontiguous. In this instance, the complexity of the operation for determining an RIV is relatively low. For example, according to the mapping relationship of FIG. 9E, the value of the RIV 904 may be determined according to Equation 3.

$$RIV = N_{RB}^{DL}(L_{CRB} - 1) + RB_{start} \quad \text{Equation 3}$$

where $L_{CRB} \geq 1$.

In Equation 3, the RIV is a parameter indicating allocated RBs. $N_{RB}^{DL}$ denotes the total number of RBs or RB groups existing in the entire frequency band. $L_{CRB}$ denotes the length of allocated resources, which may be the number of RBs or RB groups. $RB_{start}$ denotes the start point of allocated resources.

Equation 3 does not require checking first whether the sum of the start point of RBs and the number of allocated RBs exceeds the maximum index. In this instance, as illustrated in FIG. 9C, if RB #0, RB #4, and RB #5 are allocated, the value of the RIV 904 is determined to be 16 according to Equation 3.

A base station that uses mapping of FIG. 9E may determine the value of the RIV 904 based on Equation 3, and may generate and transmit resource allocation information including the determined value of the RIV 904. According to an embodiment, the base station may perform an operation of Equation 3 in order to determine the value of the RIV 904, every time that the base station performs resource allocation. Alternatively, according to another embodiment, the base station stores information (e.g., a mapping table) indicating a mapping relationship previously determined by Equation 3, and may search for the value of the RIV 904 corresponding to allocated RBs from the stored information.

For example, according to the mapping relationship of FIG. 9E, based on the value of the RIV 904 included in the resource allocation information, allocated resources may be identified as shown in Equation 4.

Step-1: $x = \mod(RIV, N_{RB}^{DL})$, $y = \lfloor RIV \mid N_{RB}^{DL} \rfloor$ Step-2: $L_{CRB} = y + 1$, $RB_{start} = x$ Step-3: if $L_{CRB} \leq N_{RB}^{DL} - RB_{start}$ then Allocated RB index = $RB_{start}, RB_{start}+1, \ldots, L_{CRB} + RB_{start} - 1$ else Allocated RB index = $RB_{start}, RB_{start}+1, \ldots, N_{RB}^{DL} - 1, 0, \ldots, L_{CRB} + RB_{start} - N_{RB}^{DL} - 1$  Equation 4

In Equation 4, the RIV is a parameter indicating allocated RBs. $N_{RB}^{DL}$ denotes the total number of RBs or RB groups existing in the entire frequency band. $L_{CRB}$ denotes the length of allocated resources, which may be the number of RBs or RB groups. $RB_{start}$ denotes the start point of allocated resources.

A terminal that receives an RIV according to the mapping of FIG. 9E may interpret the value of the RIV 904 according to Equation 4, and may identify allocated RBs. According to an embodiment, the terminal may perform an operation of Equation 4 in order to determine allocated RBs every time that the terminal receives resource allocation information. Alternatively, according to another embodiment, the terminal stores information (e.g., a mapping table) indicating a mapping relationship previously determined by Equation 2, and may search for allocated RBs corresponding to the value of the received RIV 904, from the stored information.

In the embodiments which have been described with reference to FIGS. 9A to 9E, the rule of generating an RIV is not restricted by the condition that the sum of the index of the start point of RBs and the number of RBs be less than or equal to the maximum value. That is, the above-described embodiment eliminates the constraint condition, and allows the case in which the sum of the index of the start point of RBs and the number of allocated RBs is greater than the index of the last RB in the entire frequency band. In the embodiments which have been described with reference to FIGS. 9A to 9E, a unit resource for indexing is an RB. However, according to another embodiment, the above-described scheme may be used for indicating another unit resource (e.g., RBG). The resource allocation information according to the above-described embodiments may have a size, which is the same as or a maximum of 1 bit greater than, the size of resource allocation information to which circular shift is not applied.

Figure 10A:
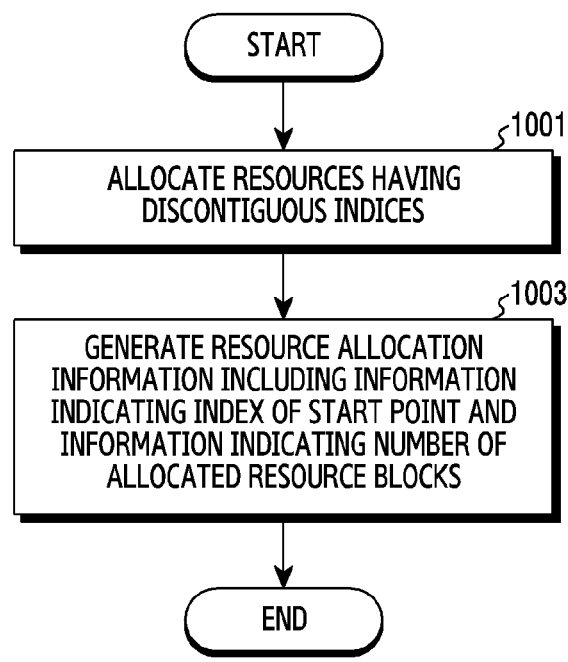
FIG. 10A is a flowchart illustrating an operation of indicating, by a base station, resources using values indicating a start point and a length in a wireless communication system according to various embodiments of the disclosure.

FIG. 10A is a flowchart illustrating an operation of indicating, by a base station, resources using values indicating a start point and a length in a wireless communication system according to various embodiments of the disclosure. FIG. 10A illustrates the operation method of the base station 110.

Referring to FIG. 10A, in operation 1001, the base station allocates resources having discontiguous indices. For example, the base station may preferentially allocate resources having high priorities, according to the priorities of the resources. In this instance, if the resources having high priorities are distributed discontiguously, resources (e.g., RBs) having discontiguous indices may be allocated. In other words, when the base station sequentially allocates RBs from the given start point of the RBs, if the index of an allocated RB exceeds the index of the last RB in the entire frequency band, the remaining RBs that need to be allocated may be allocated from the first RB of the entire frequency band.

In operation 1003, the base station generates resource allocation information including information indicating the index of the start of resources and information indicating the number of allocated RBs. That is, in the embodiment, the start point of the allocated resources and the length are informatized, respectively. In this instance, the resource allocation information according to the embodiment is not constrained by the condition that the sum of the index of the start point of resources and the number of unit resources be less than or equal to the maximum value of an index. That is, similar to the embodiment which has been described with reference to FIG. 9A, resource allocation according to the embodiment uses circular shift-based indexing. Accordingly, although the allocated resources have discontiguous indices, the resources may be indicated by at least one start point and at least one length.

According to an embodiment that indicates resources according to the procedure of FIG. 10A, the resource allocation information may be configured as shown in FIG. 10B. FIG. 10B is a diagram illustrating an example of resource allocation information that indicates resources using values indicating a start point and a length in a wireless communication system according to various embodiments of the disclosure. Referring to FIG. 10B, the resource allocation information may include a resource type indicator 1002, a first RIV 1014-1, and a second RIV 1014-2. The resource type indicator 1002 may indicate whether allocated RBs are localized VRBs or distributed VRBs. The first RIV 1014-1 indicates the start point of allocated resources, and the second RIV 1014-2 indicates the length of allocated RBs, that is, the number of allocated RBs. According to another embodiment, the resource type indicator 902 may be omitted.

The values of the first RIV 1014-1 and the second RIV 1014-2 may be determined according to Equation 5.

$$RIV_1 = Dec2Bin(RB_{start})$$

$$RIV_2 = Dec2Bin(L_{CRB}) \quad \text{Equation 5}$$

In Equation 5, $RIV_1$ denotes a parameter indicating the start point of allocated resources. $RB_{start}$ denotes the start point of allocated resource (e.g., RBs or RB groups). $RIV_2$ denotes a parameter indicating the length of allocated resources. $L_{CRB}$ denotes the length of allocated resources, and indicates the number of RBs or RB groups. Dec2Bin( ) denotes a function of converting a decimal number to a binary number.

For example, as illustrated in FIG. 9C, if RB #0, RB #4, and RB #5 are allocated, the value of the first RIV 1014-1 is determined to be 4, and the value of the second RIV 1014-2 is determined to be 3, according to Equation 5.

Also, based on the values of the first RIV 1014-1 and the second RIV 1014-2 included in the resource allocation information, the allocated resources may be identified according to Equation 6.

Step-1: $L_{CRB}=Bin2Dec(RIV_2)$, $RB_{start}=Bin2Dec(RIV_1)$

Step-2: if $L_{CRB} \leq N_{RB}^{DL} - RB_{start}$, then

Allocated RB index=$RB_{start}, RB_{start}+1, \ldots, L_{CRB}+RB_{start}-1$ else Allocated RB index=$RB_{start}, RB_{start}+1, \ldots, N_{RB}^{DL}-1, 0, \ldots, L_{CRB}+RB_{start}-N_{RB}^{DL}-1$ \quad Equation 6

In Equation 6, $L_{CRB}$ denotes the length of allocated resources, and indicates the number of RBs or RB groups. $RIV_2$ denotes a parameter indicating the length of allocated resources. $RB_{start}$ denotes the start point of allocated resources (e.g., RBs or RB groups). $RIV_1$ denotes a parameter indicating the start point of allocated resources. $N_{RB}^{DL}$ denotes the total number of RBs or RB groups existing in the entire frequency band. Bin2Dec( ) denotes a function of converting a binary number to a decimal number.

According to an embodiment, operations for determining and interpreting the values of the first RIV 1014-1 and the second RIV 1014-2, such as Equation 5 and Equation 6, may be performed by the base station and the terminal every time that resource allocation is performed. Alternatively, according to another embodiment, information (e.g., a mapping table) indicating the mapping relationship between RIV values and RBs is defined in advance based on Equation 5 and Equation 6, and a base station and a terminal may search for required information from the information indicating the mapping relationship.

In the embodiments which have been described with reference to FIGS. 10A and 10B, the rule of generating an RIV is not constrained by the condition that the sum of the index of the start point of RBs and the number of RBs be less than or equal to the maximum value. That is, the above-described embodiment eliminates the constraint condition, and allows the case in which the sum of the index of the start point of RBs and the number of allocated RBs is greater than the index of the last RB in the entire frequency band. In the embodiments which have been described with reference to FIGS. 10A and 10B, a unit resource for indexing is an RB. However, according to another embodiment, the above-described scheme may be used for indicating another unit resource (e.g., RBG).

Figure 11A:
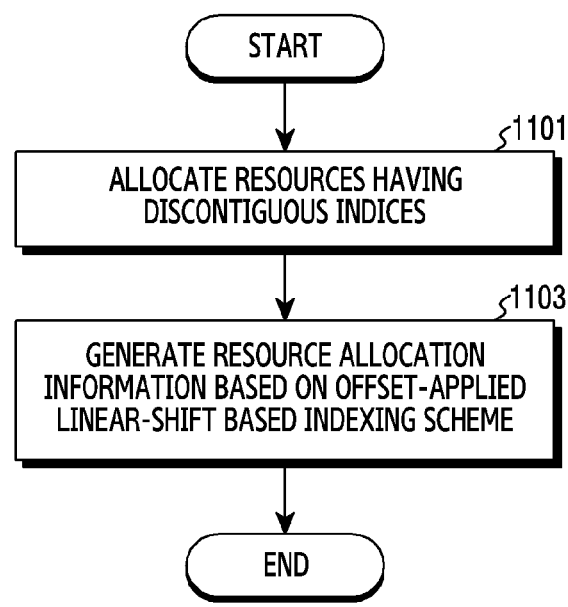
FIG. 11A is a flowchart illustrating an operation of indicating, by a base station, resources allocated using an offset (with an offset) in a wireless communication system according to various embodiments of the disclosure.

FIG. 11A is a flowchart illustrating an operation of indicating, by a base station, resources allocated using an offset (with an offset) in a wireless communication system according to various embodiments of the disclosure. FIG. 11A illustrates the operation method of the base station 110.

In operation 1101, the base station allocates resources having discontiguous indices. For example, the base station may preferentially allocate resources having high priorities, according to the priorities of the resources. In this instance, if the resources having high priorities are distributed discontiguously, resources (e.g., RBs) having discontiguous indices may be allocated. In other words, when the base station sequentially allocates RBs from the given start point of the RBs, if the index of an allocated RB exceeds the index of the last RB in the entire frequency band, the remaining RBs that need to be allocated may be allocated from the first RB of the entire frequency band or an RB subsequent thereto.

In operation 1103, the base station generates resource allocation information according to an offset-applied circular shift-based indexing scheme. An offset may be used for changing the boundary of resources indicated by the resource allocation information. Resources, which are allocated by excluding some RBs corresponding to a high or low index in the entire frequency band may be indicated using an offset. Particularly, the offset may be used to control the minimum index or the maximum index of candidate RBs which may be indicated by the resource allocation information. That is, by using the offset, the base station may indicate a discontiguous point at the end (e.g., the minimum index or the maximum index) of RBs.

To clearly describe the embodiment that indicates resources according to the procedure of FIG. 11A, a detailed example will be described with reference to FIGS. 11B to 11D.

Figure 11B:
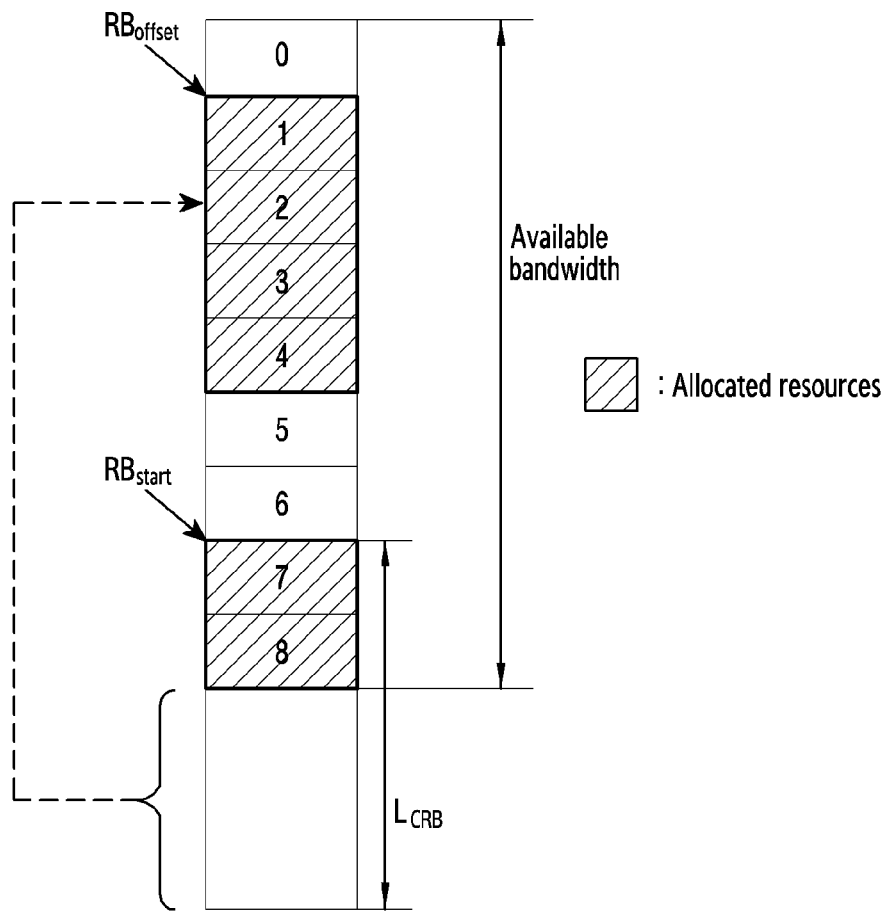
FIG. 11B is a diagram illustrating another example of a resource allocation result in a wireless communication system according to various embodiments of the disclosure.

FIG. 11B is a diagram illustrating another example of a resource allocation result in a wireless communication system according to various embodiments of the disclosure. FIG. 11B illustrates an example of a resource allocation result when an offset is used. Referring to FIG. 11B, six RBs among eight RBs may be allocated. In this instance, the six RBs include RB #1, RB #2, RB #3, RB #4, RB #7, and RB #8. Two discontiguous points exist. Accordingly, it is difficult to express the resource allocation result of FIG. 11 using a single start point and a single length, even though circular shift is used. Therefore, an offset is applied to a low index so as to indicate that RB #0 is excluded from allocated resources.

Figure 11C:
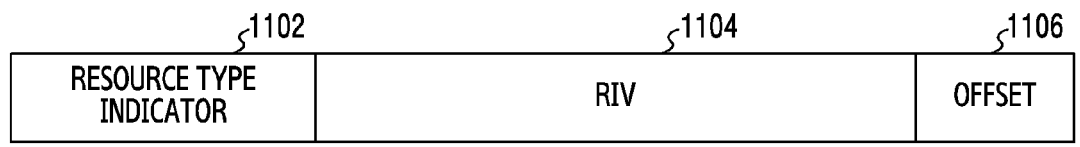

FIGS. 11C and 11D are diagrams illustrating examples of resource allocation information indicating resources allocated using an offset (with an offset) in a wireless communication system according to various embodiments of the disclosure. FIG. 11C illustrates the case in which a single RIV is used. FIG. 11D illustrates the case in which two RIVs are used. Referring to FIG. 11C, the resource allocation information includes a resource type indicator 1102, an RIV 1104, and an offset 1106. Referring to FIG. 11D, the resource allocation information includes the resource type indicator 1102, a first RIV 1114-1, a second RIV 1114-2, and an offset 1106. According to another embodiment, the resource type indicator 1102 may be omitted.

According to embodiments of FIGS. 11C and 11D, the resource allocation information includes a single offset value. According to another embodiment, two or more offset values may be included. In this instance, one offset may be applied to RBs corresponding to high indices and the other offset may be applied to RBs corresponding to low indices.

In the embodiments which have been described with reference to FIGS. 11A to 11C, a unit resource for indexing is an RB. However, according to another embodiment, the above-described scheme may be used for indicating another unit resource (e.g., RBG).

Figure 12A:
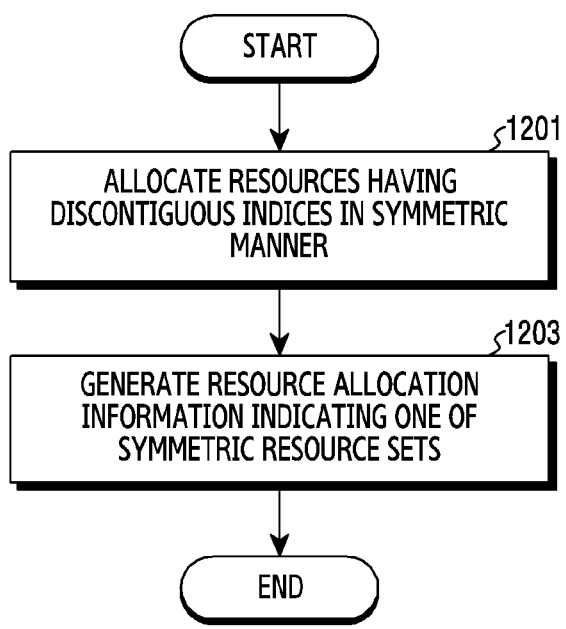
FIG. 12A is a flowchart illustrating an operation of indicating, by a base station, resources allocated symmetrically in a wireless communication system according to various embodiments of the disclosure.

FIG. 12A is a flowchart illustrating an operation of indicating, by a base station, a resource allocated symmetrically in a wireless communication system according to various embodiments of the disclosure. FIG. 12A illustrates the operation method of the base station 110.

Referring to FIG. 12A, in operation 1201, the base station allocates resources having discontiguous indices, in a symmetric manner. For example, the base station may preferentially allocate resources having high priorities, according to the priorities of the resources. In this instance, if the resources having high priorities are distributed discontiguously, resources (e.g., RBs) having discontiguous indices may be allocated. For example, the base station may allocate n RBs from an RB having the minimum index, in ascending order, and may allocate n RBs from an RB having the maximum index, in descending order.

In operation 1203, the base station generates resource allocation information indicating one of symmetric resource sets. The symmetric resource sets may include the same number of RBs. Therefore, the base station may indicate all resource groups by providing information associated with one of the resource sets. That is, the resource allocation information may include allocation information associated with only one resource set of the symmetric resource sets. Here, the allocation information associated with one resource set may indicate allocated RBs, using one of a bitmap format or a start point and length format. In addition, the resource allocation information may further include information indicating that resources are allocated in a symmetric manner.

To clearly describe the embodiment that indicates resources according to the procedure of FIG. 12A, a detailed example will be described with reference to FIGS. 12B to 12D.

Figure 12B:
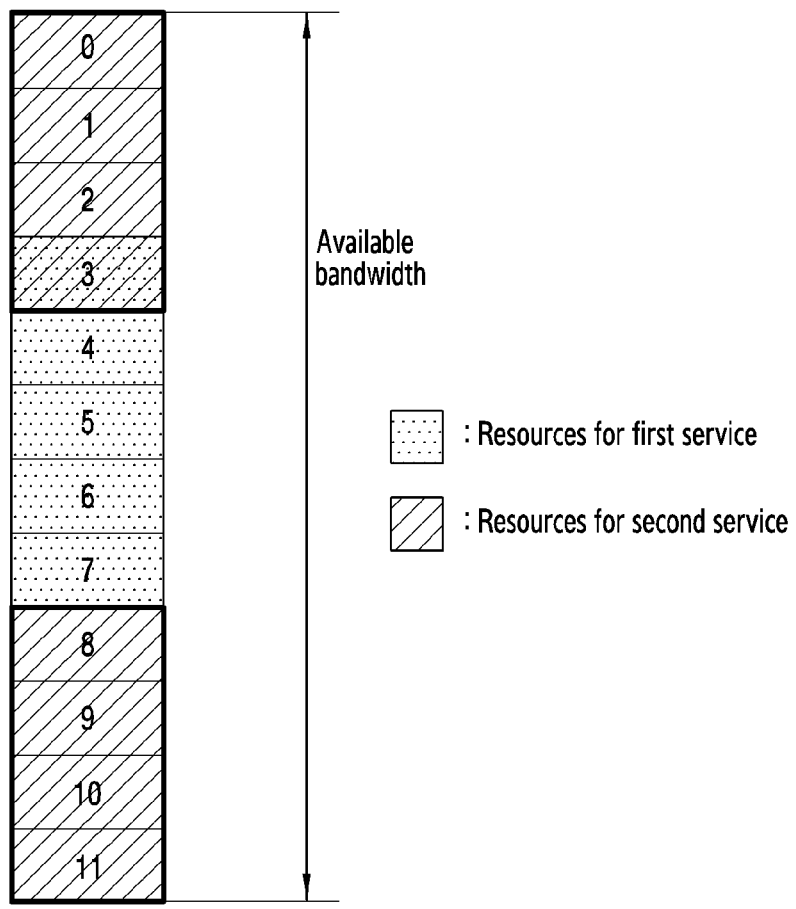
FIG. 12B is a diagram illustrating another example of a resource allocation result in a wireless communication system according to various embodiments of the disclosure.

FIG. 12B is a diagram illustrating another example of a resource allocation result in a wireless communication system according to various embodiments of the disclosure. FIG. 12B illustrates an example of a resource allocation result when resources are allocated in a symmetric manner. Referring to FIG. 12B, eight RBs among twelve RBs may be allocated. Eight RBs may be divided into two RB sets including four RBs. One RB set includes four RBs from RB #0 which has the minimum index value, and the other RB set includes four RBs from RB #11 which has the maximum index value.

FIGS. 12C and 12D are diagrams illustrating examples of resource allocation information indicating resources allocated symmetrically in a wireless communication system according to various embodiments of the disclosure. FIG. 12C illustrates the case in which allocated RBs are indicated based on a bit map format, and FIG. 12D illustrates the case in which allocated RBs are indicated based on a start point and length format.

Referring to FIG. 12C, the resource allocation information includes a type indicator 1222, an RBG configuration 1224, and allocation information 1226. The type indicator 1222 indicates a resource allocation scheme, that is, an interpretation scheme for a bitmap included in the allocation information 1226. For example, the type indicator 1222 may indicate a symmetric resource allocation scheme of the embodiment, or may indicate at least one other scheme using a bitmap (e.g., LTE type 0 or LTE type 1). The RBG configuration 1224 indicates the number of RBs included in a single RBG. The allocation information 1226 includes a bitmap, bits included in the bitmap correspond to RBs, and each bit value indicates whether each RB is allocated. For example, if the total number of RBs is 12 as illustrated in FIG. 12B, the RBG configuration 1224 is set to "1", the length of bitmap included in the allocation information 1226 is 6, and the value of the bitmap is set to "111100". According to another embodiment, at least one of the type indicator 1222 and the RBG configuration 1224 may be omitted.

Referring to FIG. 12D, the resource allocation information includes the type indicator 1222, the RBG configuration 1224, and an RIV 1228. The type indicator 1222 indicates a resource allocation scheme, that is, an interpretation scheme for the RIV 228. For example, the type indicator 1222 may indicate a symmetric resource allocation scheme of the embodiment, or may indicate at least one other scheme (e.g., LTE type 0, LTE type 1, or LTE type 2). The RBG configuration 1224 indicates the number of RBs included in a single RBG. The RIV 1228 includes at least one value indicating the start point of RBs and the number of allocated RBs. For example, if the total number of RBs is 12 as illustrated in FIG. 12B, the RBG configuration 1224 is set to "1", and the RIV 1228 may be set to a value indicating RB #0, RB #1, RB #2, and RB #3 (e.g., 18 in the case of using 1 to 20 in the mapping relationship of FIG. 9D). According to another embodiment, at least one of the type indicator 1222 and the RBG configuration 1224 may be omitted.

Figure 13A:
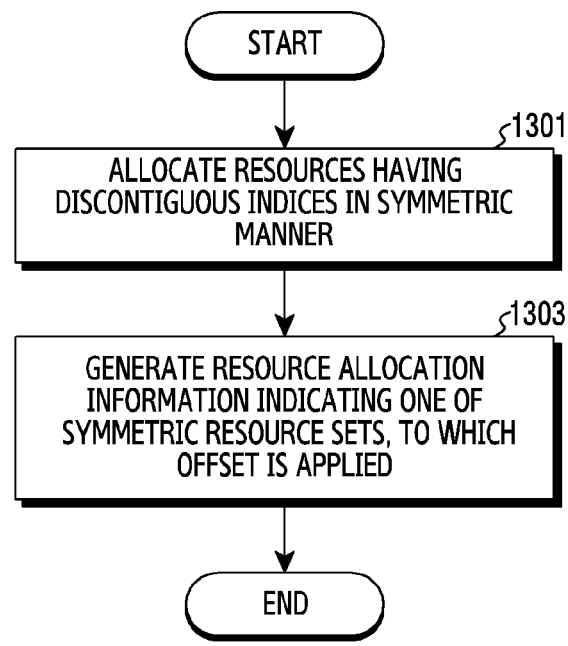
FIG. 13A is a flowchart illustrating an operation of indicating, by a base station, resources which are allocated symmetrically using an offset (with an offset), in a wireless communication system according to various embodiments of the disclosure.

FIG. 13A is a flowchart illustrating an operation of indicating, by a base station, resources symmetrically allocated using an offset (with an offset), in a wireless communication system according to various embodiments of the disclosure. FIG. 13A illustrates the operation method of the base station 110.

Referring to FIG. 13A, in operation 1301, the base station allocates resources having discontiguous indices, in a symmetric manner. Here, the resources may not be symmetric in the entire available band, but may be symmetric in a band to which an offset is applied. For example, a base station may allocate n RBs from an RB having index k, in ascending order, and may allocate n RBs from an RB having the maximum index, in descending order.

In operation 1303, the base station generates resource allocation information which indicates one of symmetric resource sets, to which an offset is applied. The symmetric resource sets may include the same number of RBs. Therefore, the base station may indicate all resource groups by providing information associated with one of the resource sets. That is, the resource allocation information may include an offset value and may include allocation information associated with only one resource set of the symmetric resource sets. Here, the allocation information associated with one resource set may indicate allocated RBs using one of a bitmap format or a start point and length format. In addition, the resource allocation information may further include information indicating that resources are allocated in a symmetric manner.

To clearly describe the embodiment that indicates resources according to the procedure of FIG. 13A, a detailed example will be described with reference to FIGS. 13B and 13C.

Figure 13B:
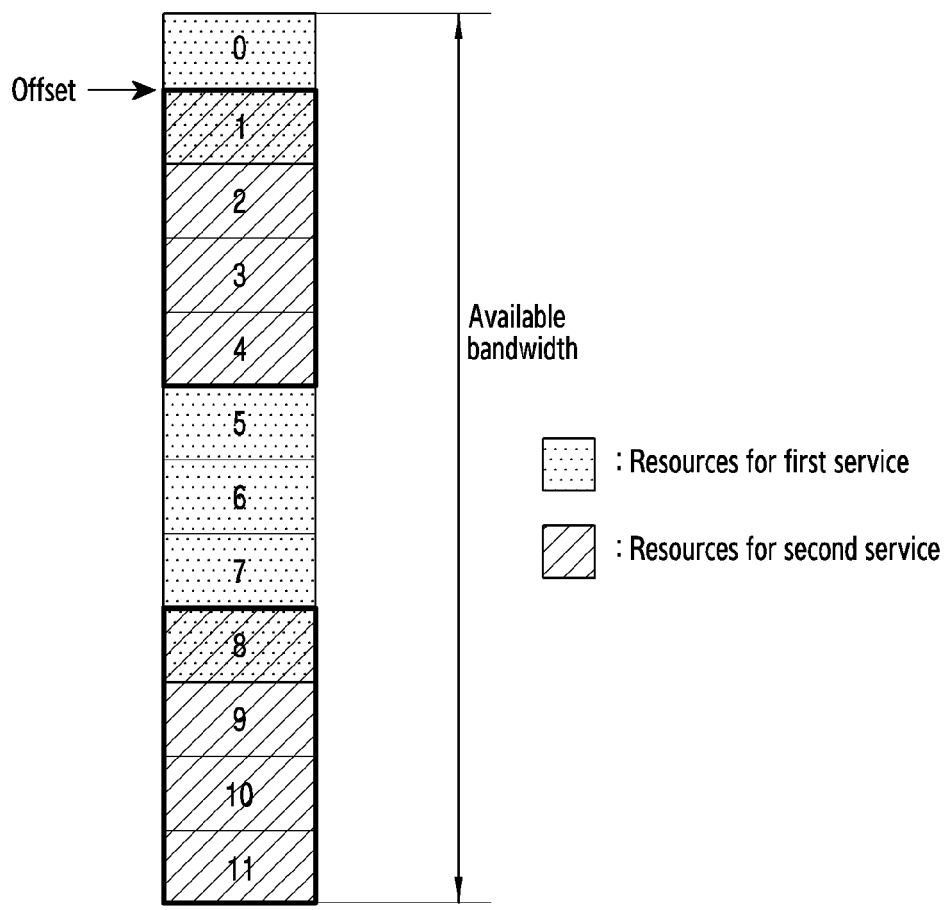
FIG. 13B is a diagram illustrating another example of a resource allocation result in a wireless communication system according to various embodiments of the disclosure.

FIG. 13B is a diagram illustrating another example of a resource allocation result in a wireless communication system according to various embodiments of the disclosure. FIG. 13B illustrates an example of a resource allocation result when resources are allocated in a symmetric manner using an offset. Referring to FIG. 13B, eight RBs among twelve RBs may be allocated. Eight RBs may be divided into two RB sets including four RBs. In this instance, an offset is applied, and thus, the RB set corresponding to low indices may include four RBs from RB #1 which has index 1, as opposed to an RB having the minimum index. The other RB set corresponding to high indices may include four RBs from RB #11 which has the maximum index.

FIG. 13C is a diagram illustrating an example of resource allocation information indicating resources are symmetrically allocated using an offset (with an offset), in a wireless communication system according to various embodiments of the disclosure. Referring to FIG. 13C, the resource allocation information includes a type indicator 1322, an RBG configuration 1324, an RIV 1326, and an offset 1328. The type indicator 1322 indicates a resource allocation scheme, that is, an interpretation scheme for the RIV 1326. For example, the type indicator 1322 may indicate a symmetric resource allocation scheme of the embodiment, or may indicate at least one other scheme (e.g., LTE type 0, LTE type 1, or LTE type 2). The RBG configuration 1324 indicates the number of RBs included in a single RBG. The RIV 1326 includes at least one value indicating the start point of RBs and the number of allocated RBs. For example, if the total number of RBs is 12 as illustrated in FIG. 13B, the RBG configuration 1324 is set to "1", the offset 1228 is set to "1", the RIV 1326 may be set to a value indicating RB #1, RB #2, RB #3, and RB #4 (e.g., 19 in the case of using 1 to 20 in the mapping relationship of FIG. 9D). According to another embodiment, at least one of the type indicator 1322 and the RBG configuration 1324 may be omitted.

According to various embodiments, resources allocated for the second service may be effectively indicated. Particularly, if resource blocks allocated for the second service are logically or physically discontiguously distributed in the frequency axis, the allocated resources may be effectively indicated. It has been described that the resource allocation information according to the above-described embodiments indicates a resource allocation result using a scheme of specifying allocated resource blocks. However, according to other embodiments, resource allocation may specify resource blocks that are not allocated. For example, if RB #0, RB #4, and RB #5 are allocated as illustrated in FIG. 9C, resource allocation information may specify RB #1, RB #2, and RB #3 (by setting the RIV to 13) so as to indicate that RB #0, RB #4, and RB #5 are allocated.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a base station in a wireless communication system, the method comprising:
    allocating a first resource for a first service;
    allocating a second resource for a second service based on the first resource; and
    transmitting resource allocation information regarding the second resource and data of the second service,
    wherein the second resource includes a first part and a second part that are discontinuous in a frequency axis,
    wherein the resource allocation information indicates the second resource using at least one start point and at least one length, and
    wherein allocating the second resource comprises:
        allocating a remaining resource, after excluding the first resource, for the second service in a slot corresponding to the second service;
        puncturing at least a part of the first resource if a size of a resource required for the second service is greater than a size of the remaining resource; and
        allocating at least the part of the first resource, for the second service.

2. The method of claim 1, wherein the resource allocation information further comprises an offset for adjusting a minimum index or a maximum index of candidate resource blocks indicated by the resource allocation information.

3. The method of claim 1, wherein the resource allocation information comprises a value indicating one of a plurality of combinations derived from allocable resource blocks, and
    at least one combination of the plurality of combinations comprises resource blocks, a number of which is smaller than a total number of the allocable resource blocks, and comprises a resource block having a minimum index and a resource block having a maximum index among the allocable resource blocks.

4. The method of claim 3, wherein combinations including discontiguously distributed resource blocks among the plurality of combinations are defined to be indicated by contiguous values.

5. A method performed by a terminal in a wireless communication system, the method comprising:
    receiving resource allocation information regarding a second resource for a second service which is allocated based on a first resource for a first service; and
    receiving data based on the resource allocation information,
    wherein the second resource includes a first part and a second part that are discontinuous in a frequency axis,
    wherein the resource allocation information indicates the second resource using at least one start point and at least one length,
    wherein the second resource comprises a remaining resource, after excluding the first resource, for the second service in a slot corresponding to the second service, and
    wherein if a size of a resource required for the second service is greater than a size of the remaining resource, the second resource comprises at least a part of the first resource which is punctured and is allocated for the second service.

6. The method of claim 5, wherein the resource allocation information further comprises an offset for adjusting a minimum index or a maximum index of candidate resource blocks indicated by the resource allocation information.

7. The method of claim 5, wherein the resource allocation information comprises a value indicating one of a plurality of combinations derived from allocable resource blocks, and
    at least one combination of the plurality of combinations comprises resource blocks, a number of which is smaller than a total number of the allocable resource blocks, and comprises a resource block having a minimum index and a resource block having a maximum index among the allocable resource blocks.

8. The method of claim 7, wherein combinations including discontiguously distributed resource blocks among the plurality of combinations are defined to be indicated by contiguous values.

9. A terminal in a wireless communication system, the terminal comprising:
    a transceiver configured to receive resource allocation information regarding a second resource for a second service allocated based on a first resource for a first service, and to receive data based on the resource allocation information,
    wherein the second resource includes a first part and a second part that are discontinuous in a frequency axis,
    wherein the resource allocation information indicates the second resource using at least one start point and at least one length,
    wherein the second resource comprises a remaining resource, after excluding the first resource, for the second service in a slot corresponding to the second service, and
    wherein if a size of a resource required for the second service is greater than a size of the remaining resource, the second resource comprises at least a part of the first resource which is punctured and is allocated for the second service.

10. The terminal of claim 9, wherein the resource allocation information further comprises an offset for adjusting a minimum index or a maximum index of candidate resource blocks indicated by the resource allocation information.

11. The terminal of claim 9, wherein the resource allocation information comprises a value indicating one of a plurality of combinations derived from allocable resource blocks, and
    at least one combination of the plurality of combinations comprises resource blocks, a number of which is smaller than a total number of the allocable resource blocks, and comprises a resource block having a minimum index and a resource block having a maximum index among the allocable resource blocks.

12. The terminal of claim 11, wherein combinations including discontiguously distributed resource blocks among the plurality of combinations are defined to be indicated by contiguous values.

* * * * *